United States Patent [19]

MacLeod

[11] Patent Number: 4,739,325
[45] Date of Patent: * Apr. 19, 1988

[54] APPARATUS AND METHOD FOR DOWN-HOLE EM TELEMETRY WHILE DRILLING

[75] Inventor: Norman C. MacLeod, Sunnyvale, Calif.

[73] Assignee: MacLeod Laboratories, Inc., Menlo Park, Calif.

[*] Notice: The portion of the term of this patent subsequent to Mar. 25, 2003 has been disclaimed.

[21] Appl. No.: 838,639

[22] Filed: Mar. 6, 1986

Related U.S. Application Data

[63] Continuation-in-part of Ser. No. 429,823, Sep. 9, 1982, Pat. No. 4,578,675.

[51] Int. Cl.⁴ ........................... G01V 1/00; G01V 3/10
[52] U.S. Cl. ..................................... 340/854; 324/342; 364/422
[58] Field of Search ............... 166/66, 250; 175/38, 175/40, 41, 48, 50, 42; 324/342, 356, 369, 323; 340/853, 854, 855, 856, 859; 364/421, 422; 367/81, 82, 36, 37, 38; 73/151

[56] References Cited

U.S. PATENT DOCUMENTS

| | | | |
|---|---|---|---|
| 2,364,957 | 12/1944 | Douglas | 175/82 |
| 2,389,241 | 11/1944 | Silverman | 177/352 |
| 2,544,569 | 3/1951 | Silverman | 340/854 X |
| 2,569,390 | 9/1951 | Sewell | 324/356 X |
| 3,209,323 | 9/1965 | Grossman, Jr. | 324/356 X |
| 3,305,771 | 2/1967 | Arps | 324/352 |
| 3,408,561 | 10/1968 | Redwine et al. | 324/342 |
| 4,387,372 | 6/1983 | Smith et al. | 340/854 |
| 4,438,672 | 9/1982 | Oivler | 340/854 |
| 4,507,735 | 3/1985 | Moorehead et al. | 364/422 |
| 4,525,715 | 6/1985 | Smith | 340/854 |
| 4,538,109 | 8/1985 | Clark | 324/341 X |
| 4,578,675 | 3/1986 | MacLeod | 324/356 X |
| 4,630,243 | 12/1986 | MacLeod | 324/369 X |

OTHER PUBLICATIONS

Wait & Hill; Theory of Transmission of Electromagnetic Waves Along a Drill Rod in Conducting, Rock; 5/79, IEEE Trans. Geo. Elects., vol. GE-17, No. 2, 21-24.

G. S. Smith & R. W. P. King, Resonant Linear Antenna as a Probe for Measuring the In Situ Electrical Prop. of Geo. Media; 6/74, Journal of Geophy. Research, vol. 79, No. 17, pp. 2623-2628.

K. Lee & G. Smith, Measured Prop. of Bare & Insulated Antennas in Sand; 9-75, IEEE Trans. on Antennas & Propagation, vol. AP-23, No. 5, pp. 664-670.

Primary Examiner—David H. Brown
Assistant Examiner—Brian S. Steinberger
Attorney, Agent, or Firm—Rosenblum, Parish & Bacigalupi

[57] ABSTRACT

An MWD EM data/control telemetry link between down-hole instruments and ground surface instruments dynamically adapts to the underground electrical environment utilizing a down-hole microprocessor unit and a surface data processing unit (computer) each of which continuously monitors, probes and sweeps the frequency spectrum with EM signals to determine an optimum frequency for signal transmission between the respective units via either the drill string, the surrounding strata, or both, and then generates and digitally modulates a carrier signal at such optimum frequency with data/control signals.

A particular feature of the communication system is a combination of a sensing toroid and insulated gaps interrupting electrical continuity so as to force all currents propagating in the strata and pipe string to flow through the axial opening of the sensing toroid via a conduction path dictated by considerations of electrical design rather than by mechanical constraints, thus enabling the effective electrical length of the drill string below the down-hole module to be optimized.

20 Claims, 21 Drawing Sheets

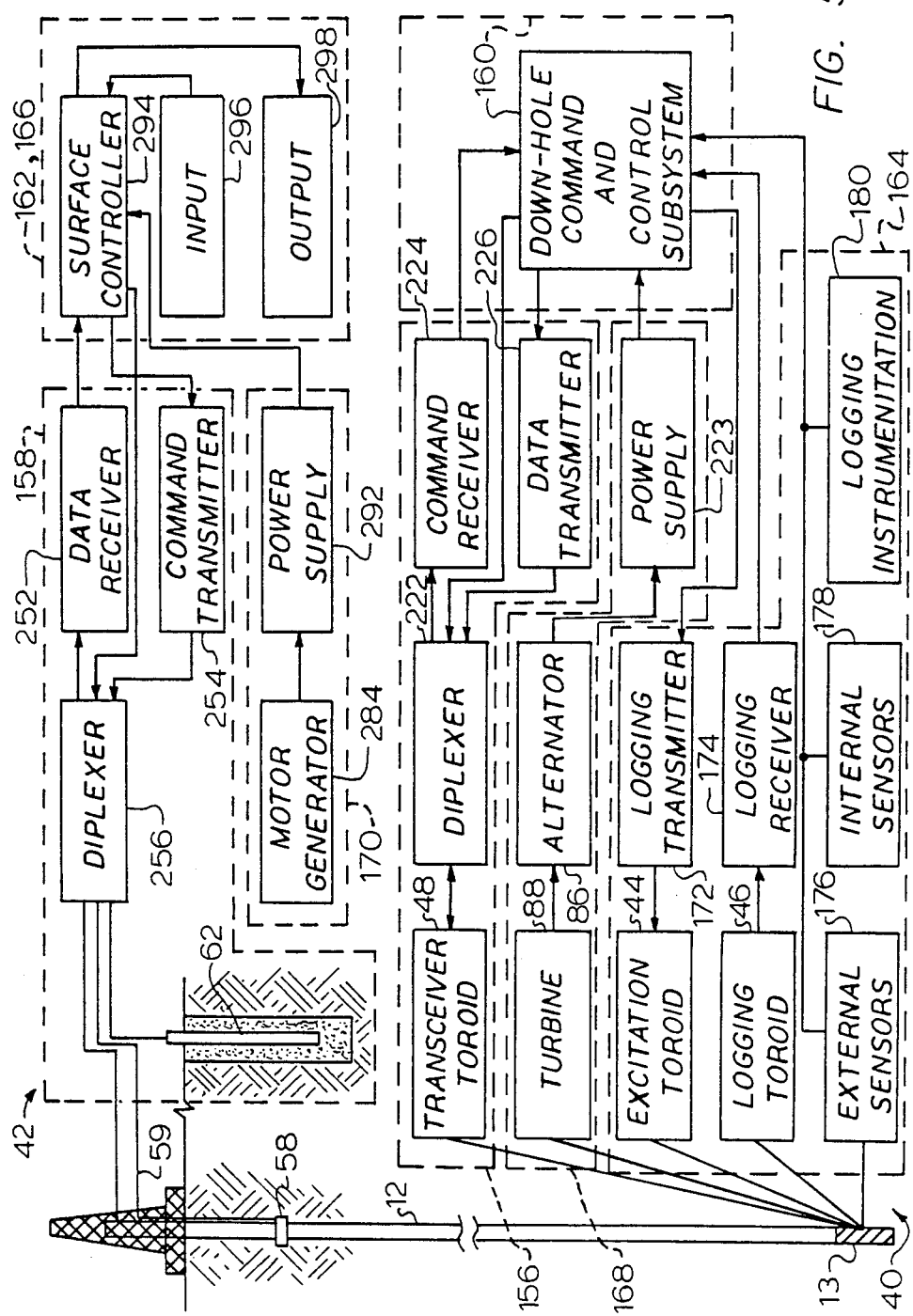

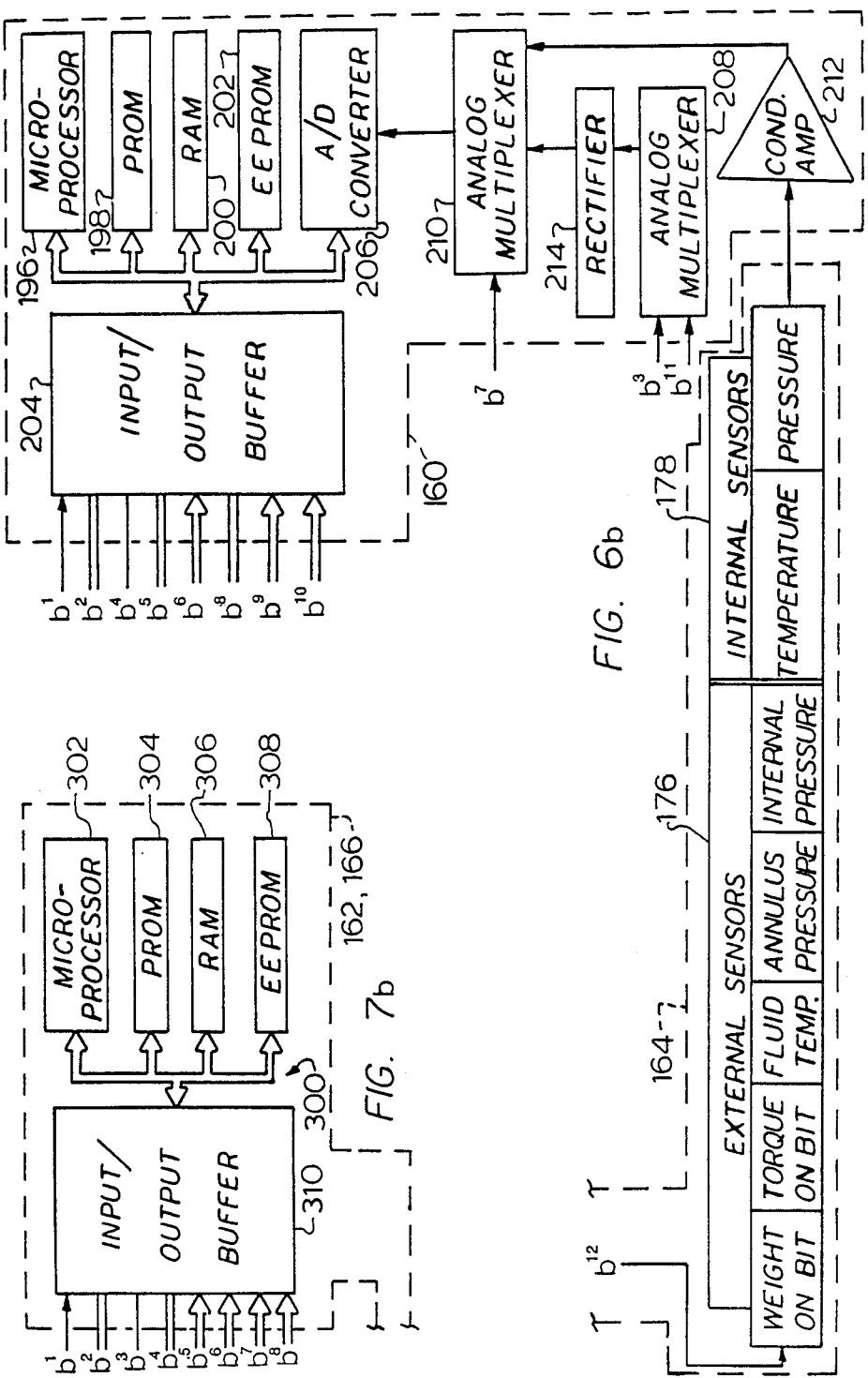

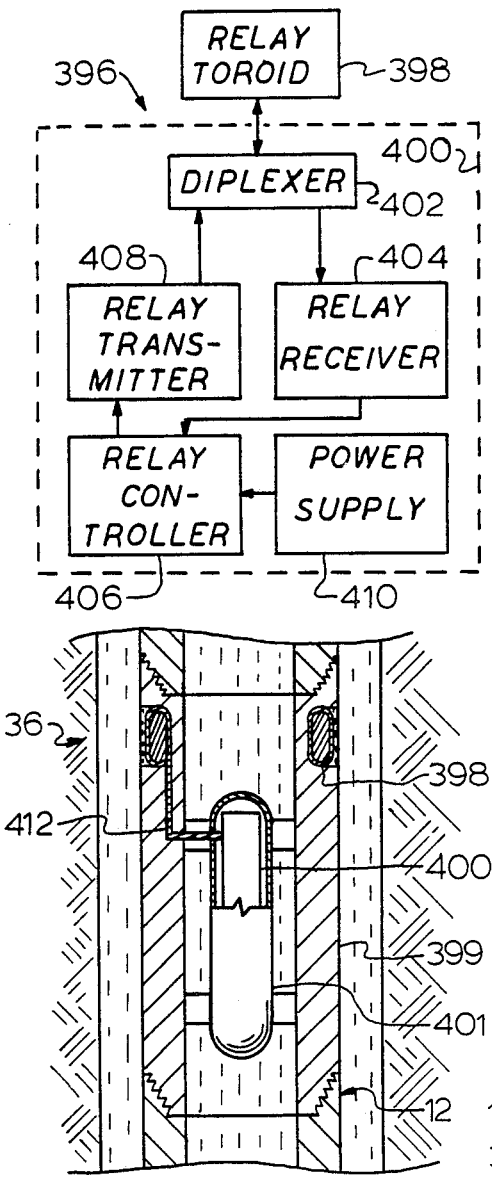
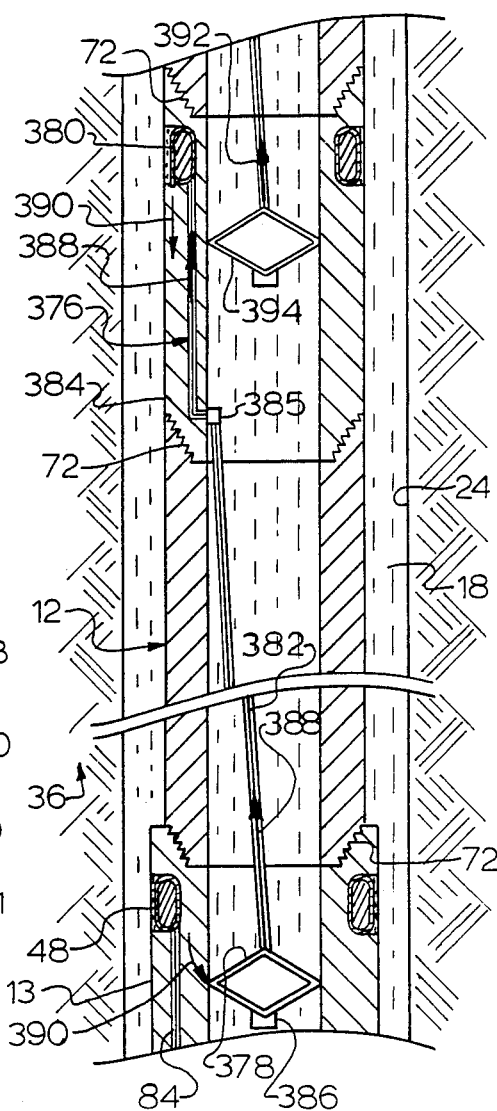
FIG. 12
FIG. 11
FIG. 10

APPARATUS AND METHOD FOR DOWN-HOLE EM TELEMETRY WHILE DRILLING

RELATED APPLICATIONS

This application is a continuation-in-part of co-pending application Ser. No. 06/429,823 entitled, "Apparatus and Method For Logging Wells While Drilling", filed Sept. 9, 1982, now U.S. Pat. No. 4,578,675. This application is also related to Applicant's U.S. Pat. No. 4,630,243, entitled "Apparatus and Method for Logging Wells while Drilling".

BACKGROUND OF THE INVENTION

1. Field of the Invention

This invention relates generally to telemetry systems for MWD well logging systems.

2. Description of the Prior Art

Data about underground strata being penetrated by a drill bit is valuable to well drillers, particularly if the data can be obtained during drilling operations without having to remove the drill string. However, the down-hole environment is extremely harsh including elevated temperatures, high pressures, and severe vibrations. Drilling fluids are also highly abrasive.

Systems capable of providing such real time data are typically referred to as, "MWD" or Measure-While-Drilling well logging tools and are serially incorporated into a drill string above the drill bit. A data telemetry or telecommunications link capable of transmitting data from down-hole to ground surface instruments and capable of transmitting control signals from ground surface to down-hole instruments are an essential subsystem in any MWD well logging tool.

In U.S. Pat. Nos. 2,354,887, 2,389,241, and 2,411,696, Silverman describes proposed MWD systems for collecting and transmitting data utilizing the drill string and either toroidal transformers or insulated electrodes to induce electromagnetic currents in underground formations for both data collection and "well signaling." In U.S. Pat. Nos. 3,793,632 and 4,302,757, Still discloses methods utilizing the drill string for data transmission with low frequency electromagnetic waves induced by toroidal transformers (virtual electrodes). Other electromagnetic wave transmission systems for establishing a data/control telemetry link between ground surface and down-hole instrumentation are described in U.S. Pat. Nos. 4,181,014, Zuvela et al; 4,087,781, Grossi et al; 4,057,781, Scherbatskoy; and 3,967,201, Rorden.

The theoretical basis for utilizing a drill string as an element for inducing electromagnetic waves or currents underground has been presented by J. R. Wait and D. A. Hill, in an article entitled "Theory of Transmission of Electromagnetic Waves Along a Drill Rod in Conducting Rock" *IEEE Trans. on Geoscience Electronics,* Vol. GE-17, No. 2, (5/79) pp. 21–24); by G. S. Smith & R. W. P. King, in an article entitled "Resonant Linear Antenna as a Probe for Measuring the In-Situ Electrical Properties Of Geological Media" *J. of Geophysical Research,* Vol. 79, No. 17, (6/74) pp. 2623–2628; and by K. Lee & G. Smith, in an article entitled "Measured Properties of Bare and Insulated Antennas in Sand" *IEEE Trans. on Antennas & Propagation,* Vol. AP-23, No. 5, (9/75) pp. 664–670.

Many different types of electromagnetic wave (EM) telemetry systems have been proposed, postulated and even tried for MWD logging tools. From the literature it is apparent that many of such EM telemetry systems would work if the underground strata were homogeneous, and undifferentiated.

However, the strata underground is typically quite inhomogeneous and differentiated. Each type of geological strata has unique properties which greatly affect transmission of electrical energy/signals through it and which vary depending on depth, local and the sequence and spacing of the different formations, among other factors. Also the electrical properties of the drill string dynamically vary with many factors including length, drilling fluid and temperature.

In summary, an EM data/control telemetry system linking an MWD logging tool to ground surface must not only survive elevated temperautres, high pressures, severe vibrations and abrasion, it must also be able to adapt and function in a constantly varying electrical environment.

DEFINITIONS

EM:
Used in place of ElectroMagnetic. Refers to low frequency electromagnetic fields used to communicate between the downhole tool and surface installation. Because the Earth is a conductive body, these electromagnetic fields create electrical currents through the Earth. This disclosure refers to the currents and the electromagnetic fields as interchangeable parts of one phenomenon.

PROM:
Used in place of Programmable Read Only Memory. One of several commercially available solid state electrical components that can be used to permanently store binary codes used in a computer system. These codes are part of the design of the preferred embodiment and are not changed during use.

EEPROM:
Used in place of Electrically Erasable Programmable Read Only Memory. One of several commercially available solid state electrical components that can be used to store binary codes when power is removed from the system. An EEPROM device is sometimes referred to as "non-volatile memory".

RAM:
Used in place of Random Access Memory. One of several commercially available solid state electrical components that can be used for the temporary storage of binary codes. Memory is volatile and stored information is lost when system power is removed.

A/D:
Used in place of Analog to Digital converter. One of several commercially available solid state electrical components used to convert a continuously varying analog voltage signal into a digital code representative of the instantaneous value of the analog voltage.

SUMMARY OF THE INVENTION

The invented system establishes an MWD EM data/control telemetry link between down-hole instruments and ground surface instruments which dynamically adapts to the electrical environment in which it functions and includes both a down-hole microprocessor unit and a surface data processing unit (computer) each of which continuously monitors, probes and sweeps the frequency spectrum with EM signals to determine an optimum frequency for signal transmission between the respective units via either the drill string, the surrounding strata, or both, and then generates and digitally modulates a carrier signal at such optimum frequency with data/control signals.

In particular, the primary object of the invention system is to provide an MWD well logging tool with a two-way telemetry link between its down-hole measurement unit and its surface instrumentation having the capacity to adapt its transmissions to electrical conditions encountered during drilling operations.

Another object of this invention is to provide MWD well logging tools with variable frequency electromagnetic wave communication means between down-hole measurement units and surface recording and control units for optimizing the quality of data transferred therebetween.

Still another object of this invention is to provide MWD well logging tools with a communication link capable of selective transmission of real-time logging data between a down-hole measurement unit and surface instrumentation with the selection based on the value of the data and the available bandwidth of the communication link.

To present the invented adaptive telemetry system in context, an MWD apparatus is described in which the down-hole measurement unit is contained in a drill collar preferably located near the end of a drill string above the drill bit. A data acquisition subsystem contained in the measurement unit has at least two electrically insulated gaps for maintaining a significant potential difference (voltage) between different sections of the drill collar, or alternatively, at least two toroidal transformers (virtual electrodes) oriented coaxial with the drill collar by generating an alternating (oscillating) voltage across one of insulated gaps, or alternatively, by driving one the toroidal transformers with an alternating (oscillating) current. The remaining gap/toroidal alternating functions as a sensor for sensing the resulting current which propagates through the surrounding underground strata and back into the drill string. The phase shift and amplitude attenuation of the current flowing in the drill string below the sensor provides data from which the electrical properties, i.e., conductivity, dielectric constant, permittivity, permeability and resistivity of surrounding strata can be derived.

In fact, it is possible through the use of appropriate signal deconvolution algorithms, to selectively focus on the portion of the sensed current scattered from geological strata 30 or more meters below the drill bit, thereby, providing an indication of the nature of the strata below the drill bit substantially before it is penetrated.

Also, it is possible to vary the penetration depth at which currents can be induced in strata surrounding the drill collar by varying the frequency of the exciting current. In particular, high frequency signal induced currents are more highly attenuated by the strata than are low frequency currents, thus the penetration depths of the sensed currents are inversely related to frequency.

The data acquisition subsystem also includes additional sensors for measuring other down-hole parameters such as weight and torque-on-bit, pressure, and temperature as well as acoustic, radiographic, directional data, etc.

The down-hole microprocessor system functions as a command/control system for the down-hole measurement unit which can respond to and even be programmed by command signals received from the surface data processing system. For example, the frequency of the generated or exciting EM current signal can be programmed to sweep through a set of different ranges and in a predetermined sequence to obtain data about the surrounding strata, and particularly, that below the drill bit.

The down-hole microprocessor can also be caused to change the carrier signal frequency used for transmitting data back to the surface data processing system. In particular, by determining the relative attenuation in the telemetry signal stream, [caused by such factors as increased drilling depth (space loss), and changes in the electrical properties of the formation, drill string and/or drilling fluid] the surface instrumentation can transmit a signal back down the drill string to cause the down-hole microprocessor commanded to switch its data transmission carrier signal to a frequency that experiences less attentuation, and/or provides a better signal-to-noise ratio.

For example, where the the drill bit encounters a high resistivity formation, the strata below the drill string may not function as an effective ground plane (return circuit), and the drill string must be treated as a vertical dipole. In such instances, the most effective carrier signal frequency will be a resonant frequency for the drill string which is ascertained by the down-hole microprocessor by sweeping a range of frequencies and determining the frequency at which maximum input current is drawn. This frequency is an optimum or tuned frequency for the drill string under the particular conditions extant at the time. (It should be realized that such resonant or optimum frequency will vary with any factor dynamically affecting the electrical environment of the drill string including but not limited to changes in drill string length, drilling fluid, temperature, and the sequence/spacing of strata penetrated as well as that below the drill string.)

The optimum data/command carrier signal frequencies may also be selected by the respective down-hole and surface processors receiving a transmission by commanding the transmitting processer to sweep a range of frequencies with the carrier signal while it monitors the level of signals detected for determining the frequency having the greatest signal amplitude. The transmitting processor is then commanded to utilize that particular frequency for the carrier signal.

A preferred frequency selection technique includes having the receiving processor send periodic acknowledgement signals to the transmitting processor so that when an acknowledgement signal is not received, the transmitting processer switches its carrier signal in increments to progressively lower frequencies until an acknowledgement is received. The down hole transmitting processor will thereafter continue to send at the lower frequency until it again does not receive an acknowledge must or is commanded by the surface unit to switch to another frequency.

Similar techniques are used for switching between various signal modulation schemes for encoding data/commands signal onto the carrier signal transmitted between the surface and down-hole processors. For example, a particular modulation scheme may be more suited to a given set of transmission parameters that another scheme. In such case, the down hole unit would be commanded to select the particular scheme from several schemes programmed into the down hole microprocesor.

Moreover, since the transmissible signal content is lower at lower frequencies, the down-hole microprocessor can also be pre-programmed or commanded from the surface to selectively transmit only the most critical down-hole data.

Power for the circuitry of the down-hole measurement unit is provided by a down-hole electrical power generator of a type such as that disclosed by Godbey in U.S. Pat. No. 3,305,825 in which the flow of drilling fluid down the hollow drill string rotates a turbine which in turn drives an alternator. The electrical output of the alternator is conditioned by a power supply and distributed to the various subsystems in the down-hole measurement unit. Batteries may also provide for back-up power.

The surface data acquisition subsystem consists of the data processor (computer), interface circuitry, CRT displays, and recorders which functionally receive the down-hole carrier signal encoded with data, process it, and output each particular data stream to corresponding displays, data memory devices and recorders in formats readable by operators and investigators.

The surface data processor controls the sequence of operations and makes decisions for the down-hole measurement unit per a software program or by operator initiated commands.

A primary advantage of the present invention is that both the transmission frequency and the manner of modulating or encoding the data/command telemetry signal with data/commands can be varied to compensate for signal degradation due to noise and attenuation, A further advantage of the present invention is that it provides a system having adaptable two way communication between the down-hole measurement unit and the surface instrumentation to allow interactive data collection and transmission while drilling.

Still another advantage of the present invention is that subsequent to completion of the drilling operation, it can be used to provide continuing information relative to conditions at the bottom of the operating well.

A particular feature of the preferred communication system is a combination of a sensing toroid with insulated gaps for interrupting electrical continuity to force all currents propagating above and below it to flow through the axial opening of the toroid via a conduction path dictated by considerations of electrical design rather than by mechanical constraints, thus enabling optimization of the effective electrical length of the drill string below the down-hole module.

Still other objects, features and advantages of the present invention will be apparent to those skilled in the art of well logging from the following description of preferred and alternative embodiments illustrated in the accompanying drawings.

DESCRIPTION OF THE DRAWINGS

FIG. 5 is a functional diagram of the MWD system of FIG. 1 including the down-hole measurement unit of FIG. 2 and a surface instrumentation.

FIG. 6a and 6b are a functional diagram of the down-hole unit of FIG. 2. The lines $a_1, a_2, \ldots a_n$ of FIG. 6a correspond to lines $b_1, b_2, \ldots b_n$ of FIG. 6b.

FIG. 7a and 7b are a functional diagram of surface instrumentation utilized in the MWD system of FIG. 1. Lines $a_1, a_2, \ldots a_n$ of FIG. 7a correspond to lines $b_1, b_2, \ldots b_n$ of FIG. 7b.

FIG. 10 is a cross-section diagram of an alternative embodiment of a portion of an MWD system which utilizes passive couples for reducing attenuation and noise in transmission signals.

FIG. 11 is a cross-section diagram of an alternative embodiment of a portion of an MWD system that employs active relays for improved communication between down-hole and surface units.

FIG. 12 is a functional diagram of an active relay utilized in the alternative embodiment of FIG. 11.

DESCRIPTION OF THE PREFERRED EMBODIMENT

Figure 1:
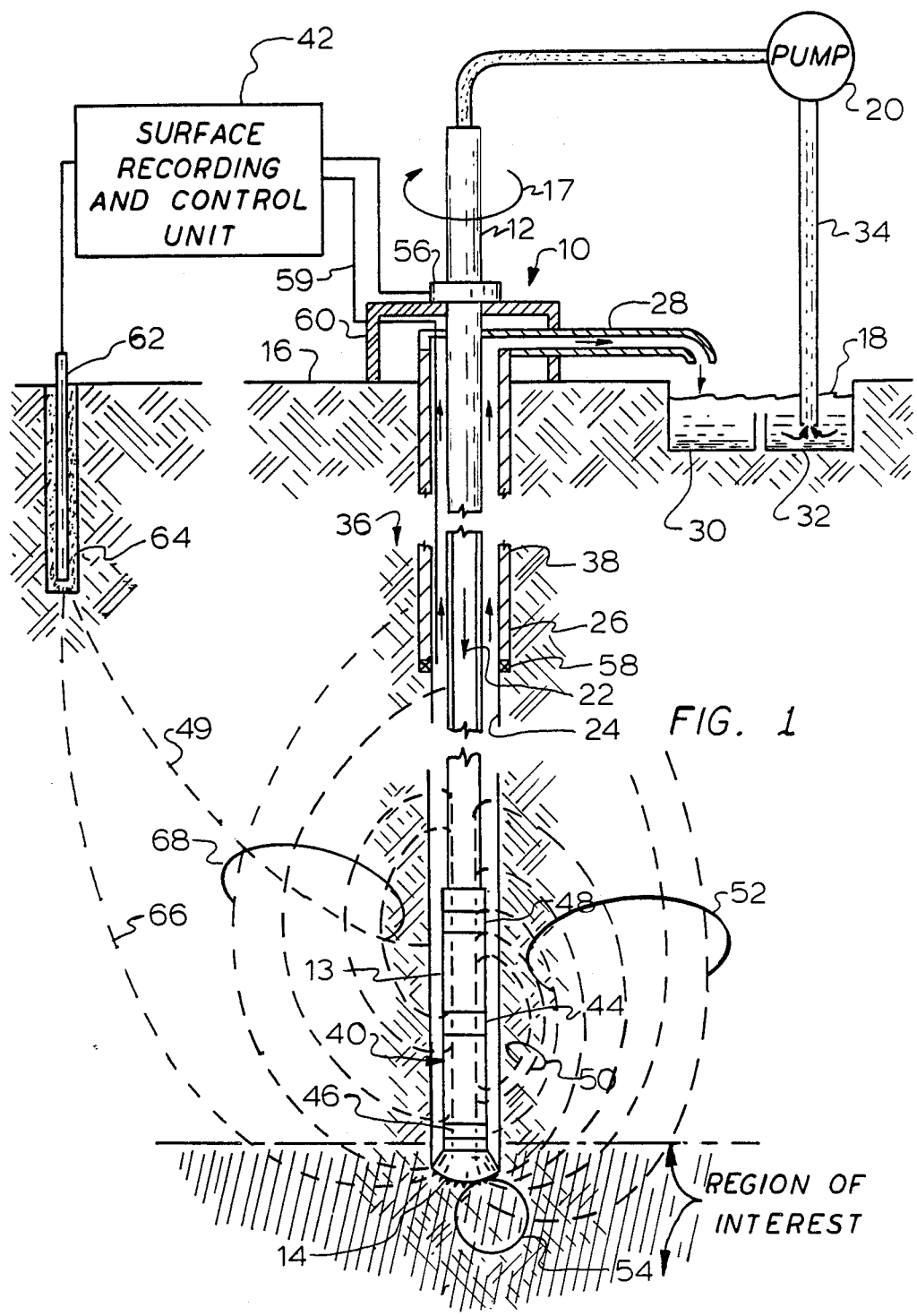
FIG. 1 and 1a each present a schematic and sectional view of an MWD system for logging wells.

FIG. 1 shows a cross-sectional view of a well 10, drilled by conventional rotary drilling apparatus which includes a drill pipe 12 (also known as a drill string) composed of a number of threadably interconnected tubular pipe sections carrying at their lower end a modified drill collar 13 terminated by a drill bit 14. The drill bit 14 is rotated in direction 17 by conventional means (not shown) to advance the depth of the well 10.

A circulating flow of drilling fluid 18 is utilized to lubricate the drill bit 14 and to convey drill tailings and debris to the surface 16. The drilling fluid 18 is pumped down the well 10 by a pump 20 through the interior of the drill pipe 12, as indicated by arrow 22, and out through the drill bit 14. The fluid returns to ground surface via the annulus between the drill pipe 12 and the bore hole 24, as indicated by arrow 26. Upon reaching the surface 16, the drilling fluid 18 is ducted by a pipe 28 to a settling pond 30 where the drill tailings precipitate from the drilling fluid. A portion of the drilling fluid 18 in the settling pond 30 spills over into a sump 32 where it is drawn into the pump 20 through an intake pipe 34 for recirculation through the well 10. The composition of the drilling fluid can be varied depending on the type of strata 36 being penetrated.

Rotary drilling systems also typically include a casing pipe 38 extending down the bore hole 24 from the well to isolate aquifers near ground surface or conflicting strata types or conditions from the well.

The particular MWD apparatus, in context of this presentation, includes a down-hole measurement unit or module 40 located in a part of the drill collar 13 at the bottom of the drill string 12 above the drill bit 14, and surface instrumentation 42 coupled to the top of the drill pipe at the surface 16. Basically, the module 40 measures various parameters of the earth strata near the drill bit 14, and various parameters dealing with the drilling operation, and then conveys these measurements to the surfaces instrumentation 42 via the drill collar 13 and the drill string 12. The drill collar 13 and the drill string 12 provide a necessary electrically conductive path from the down-hole unit 40 to the surface instrumentation 42.

In the embodiment illustrated, the module 40 includes three toroidal transformers 44, 46, and 48 each consisting of a toroid of magnetic material wound with insulated wire conductors and positioned at spaced apart vertical locations coaxially encircling the drill collar 13 such that any current signal flowing in the drill collar flows through the toroids.

The toroidal transformers 44, 46, and 48 are virtual electrodes which can function as either transmitters or receivers by inductively coupling alternating current flowing in the drill collar 13 into the coil conductors and vise versa. When acting as a transmitter, the toroidal transformer generates an alternating current flow in the encircled drill collar 13 in response to an alternating current flowing in its coil winding. Conversely, when acting as a receiver, an alternating current flow is induced in the coil winding by the flow of an alternating current in the encircled drill collar 13.

Figure 1A:
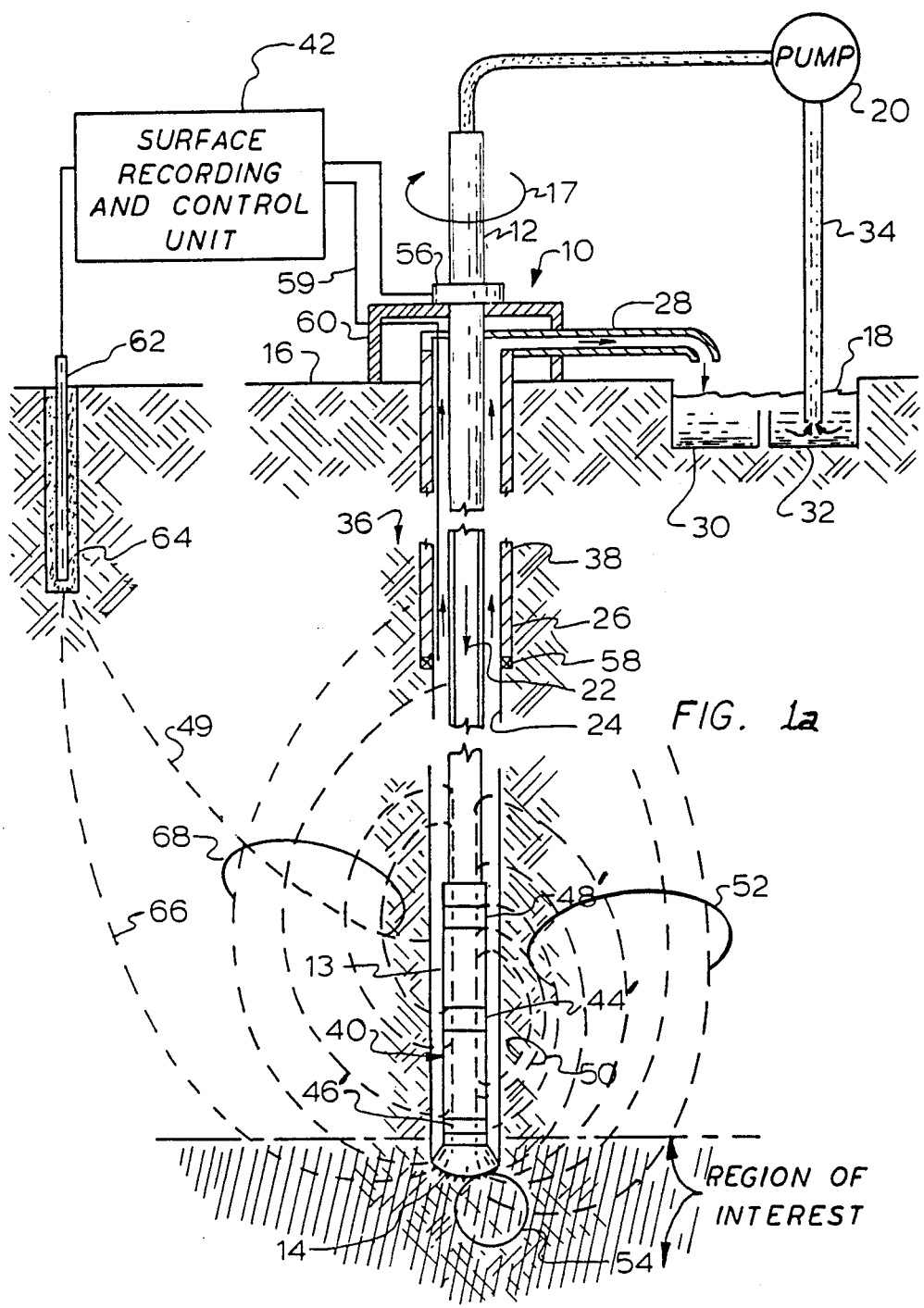

As an alternative, with appropriate interfacing modifications three electrically insulated gaps 44', 46' and 48' as shown in FIG. 1(a) can be substituted for the toroidal transformers 44, 46, and 48, in which case the alternating current which flows in each electrically isolated section of the drill string are generated/sensed (transmitted and received) by imposing or sensing an alternating voltage across a particular insulated gap respectively. In fact, as is discussed infra (FIG. 4a), a combination of a toroid and an insulated gap provides certain unique advantages, and is preferred as the down-hole sensor of scattered electrical currents. Accordingly, where a toroid is used hereinafter it is to be undersood that a gap could be substituted therefor.

The toroid 44 (the excitation toroid) acts as a transmitter generating an alternating current flow in the drill collar 13 which oscillates in the drill string, and drill bit 14, and propagates into the surrounding strata 36 through the drill bit and variously along the drill string via the drilling fluid 18 in which the drill string is immersed. To complete the circuit, the excitation current propagates or flows through the strata 36 in the regions surrounding the bottom of the well 10, and back to the drill string indicated schematically by dashed lines 50 and 52.

The toroid 46 (the sensing toroid) is located at the lower end of the drill colalr 13 nearest the drill bit 14 and senses the current flowing in the drill collar 13 at that elevation.

In particular, a portion of the excitation current flowing in the drill collar 13 scatters into the strata 36 above the sensing toroid 46, as indicated by dashed lines 50. The remainder of the generated current scatters out into the strata 36 along outer flow paths, as indicated by the lines 52. The portion of the excitation current that flows into the strata 36 below the sensing toroid 46 versus the portion that scatters into the strata above the sensing toroid is a function of the dynamic electrical environment of the drill string at that particular instant, depending on such things as the electrical properties and spacing of strata already penetrated, and unpenetrated strata below the drill bit, among other factors.

By using the sensing toroid 46 as a receiver to sense the scattered current flowing in the lower end of the drill collar 13, i.e, through drill bit 14, and by knowing the current flow generated in the drill collar by the excitation toroid 44, it is possible with appropriate signal deconvolution algorithms to detect or sense the effects of an electrical anomaly, in unpenetrated strata substantially below the drill bit at the tip of the drill string.

[In the context of this presentation, an electrical anomaly refers to something causing a perturbation in the electrical and magnetic fields generated in the underground strata by the excitation toroid 44.]

A significant change in electrical properties of strata spaced below the drill bit perturbs, or changes, the distribution of energy in the scattered electrical current sensed by the sensing toroid 46. For example, a shift in phase between the signal generated by the excitation toroid 44 and the scattered signal sensed by the sensing toroid 46, indicates a change in the dielectric properties of the materials in which the scattered signal propagates.

A large percentage of the current measured by the sensing toroid 46 passes through the drill bit 14 and out into the strata 54 below it. Placement of the sensing toroid 46 as close to the drill bit 14 as is practical maximizes this percentage.

By varying the frequency of the current generated by the excitation toroid 44 it is possible to range the distance at which an electrical anomaly occurs (a significant change in the electrical properties of the strata) beneath the down-hole measurement unit 40. In particular, high frequency signals are attenuated more by the strata than are low frequency signals. Thus, the penetration depth of the signals and the distance at which the effects of a preturbation caused by an anomaly can be sensed are inversely related to frequency.

Data indicative of the surrounding strata as well as other data acquired by the module 40 must be communicated to the surface unit 42. To accomplish this, the third toroidal transformer 48 (transceiver toroid) is utilized as a data signal transmitter to convey data to the surface 16 by inducing modulated alternating currents in the drill collar 13 and the drill string 12 for reception at the surface 16.

Command signals originating in the surface unit 42 must also be communicated to the down-hole module 40. Again, the drill pipe 12 is utilized as a conductor of a control signal modulated alternating current for purposes of communication. In this case the toroid 48 acts to receive the transmitted command signals.

The surface unit 42 may be coupled to the drill string 12 in several different ways. In one method, a coupling 56 is provided for direct electrical connection between the drill string 12 and the surface unit 42. The coupling function may be accomplished by any conductor in good electrical contact with the top of the drill string 12 and may, for example, be connected directly to a blow out preventer 60.

As suggested by Silverman in U.S. Pat. No. 2,411,696, a fourth toroidal transformer 58 may be mounted at the bottom end of the casing pipe 38 and coupled to the surface unit 42 with a shielded cable 59. The toroid 58 serves to inductively receive the signals transmitted up the drill string from the down-hole module 40 and to inductively transmit command signals from the surface unit 42 back into the drill string 12. This latter means has the advantage of eliminating atmospheric and surface noise thereby improving the signal-to-noise ratio of the transmitted signals.

A return path for the modulated alternating currents transmitted in the drill string 12 is provided by connection to one or more electrodes 62 that are buried in the earth at 64. Current flows in the strata 36 between the electrodes 62 and the drill bit 14 along a current flow path, as indicated at 66. Current flow paths 68 also exist which attenuate the transmitted signals.

Figure 2:
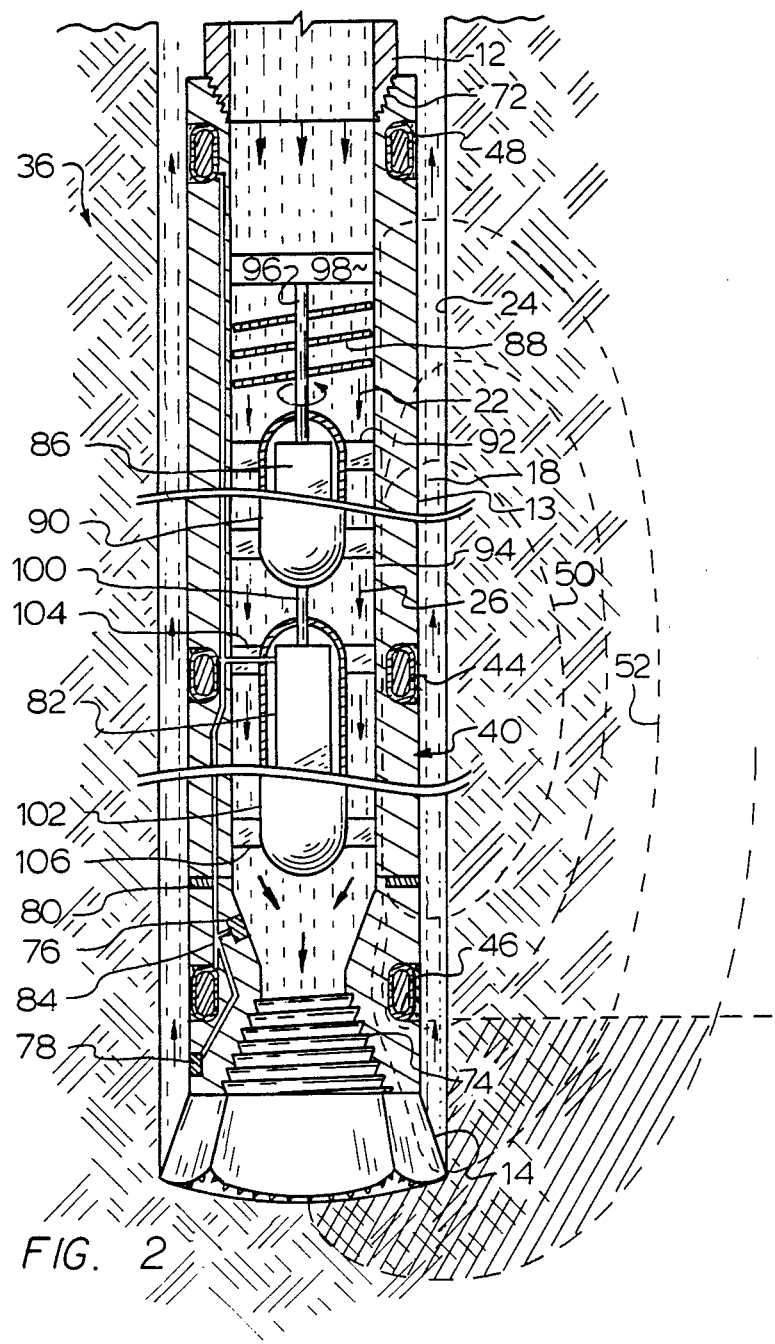
FIG. 2 is a cross-section diagram of down-hole instrumentation for gathering down-hole data.

Referring to FIG. 2, the down-hole module 40 is shown packaged and installed in a specially modified drill collar 13 which provides a housing for the attachment of the various components of the modular 40. The upper end of drill collar 13 is attached to the bottom section of the drill string 12 with a threaded connection 72. The lower end is provided with mounting threads 74 for the attachment to the lower portion of the drill string terminating in the drill bit 14.

The three toroidal transformers 44, 46, and 48 are disposed at three, spaced-apart locations along the length of the collar 13 which forms an external housing for the module 40. The transceiver toroid 48 is located near the top of the collar 13, the sensing toroid 46 at the bottom, with the excitation toroid 44 in between. If toroids are used, they would be recessed within the annular grooves shown at 43, 45 and 47. If instead, insulated gaps are used, there would be no annular grooves, but rather exterior and perhaps interior insulative sheaths (not shown), as suggested by Douglas in U.S. Pat. No. 2,364,957 (pp. 5, col. 1, 11. 9–35), to provide an effective shunt impedance relative to the drilling fluids expected to flow up and down the drill string.

Several sensors or transducers are attached to the drill collar 13 at various locations for measuring parameters such as temperatures, pressures and forces that are of interest to the drilling rig operators. By way of example, two sensors 76 and 78 are shown disposed along the interior and exterior surfaces, respectively, of the collar 13 for monitoring pressure of the drilling fluid 18. Forces such as weight and torque on the drill bit 14 are monitored by load transducers 80.

The sensors and transducers 76, 78 and 80, and the toroidal transformers 44, 46 and 48 are electrically coupled to a microprocessor system 82 via wiring harness 84. Within the system 82 are electronic circuits that process data derived from the signals sensed by the sensing toroid 46 and obtained from the sensors and transducers 76, 78 and 80.

The system 82 also encodes and decodes the signals flowing to and from the surface unit 42.

Electrical power is supplied to the system 82 by an alternator 86 coupled to a turbine 88 that is driven by the circulating drilling fluid 18. The alternator 86 is contained within a shell 90 that is attached to the collar 13 with supports 92 and 94. Upstream, the shaft 96 of the turbine 88 is rotatively coupled to a turbine support 98, while downstream, the shaft of the turbine is supported by the alternator 96 and its shell 90. Power from the alternator 86 is conveyed to the system 82 through a power cable 100.

In a fashion similar to that of the alternator 86, the electronic system 82 is housed within a shell 102 that provides a protective environment for the circuitry contained within. Supports 104 and 106 position the shell 102 within the collar 13. Both the shells 90 and 102 and supports 92, 94, 98, 104 and 106 are preferably streamlined to minimize flow restriction of the drilling fluid 18 within the drill string.

Figure 3:
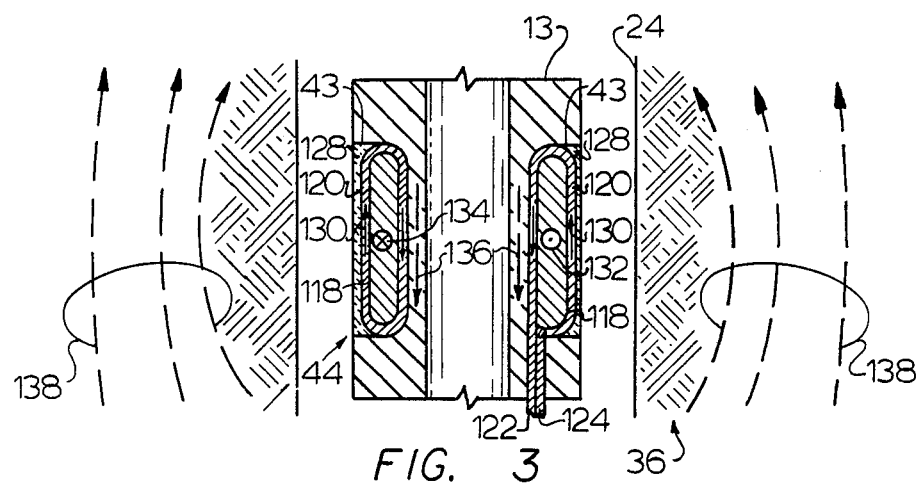
FIG. 3 is a cross-section diagram of a toroidal transformer utilized as a transmitter in the down-hole unit of FIG. 2.

FIG. 3 diagrams the configuration and operation of a typical excitation toroid 44. Physically, the excitation toroid 44 is composed of a toroidal shaped core 118 of a magnetic material such as iron or ferrite with a coil winding 120 of insulated wire wrapped such that each loop of wire passes from the inside to the outside of the core. Two leads 122 and 124 of the coil winding 120 are connected to the system 82 through the wiring harness 84. The toroid is installed in the annular recess 43 formed in the collar 13 and is protected by the insulative cover 128 of potting material or the like.

In operation, an alternating current is caused to flow in the coil winding 120, as depicted at an instant of time by arrows 130. This current flows develops a magnetic field which in turn generates an oscillating electrical current 136 in the drill collar 13. Since the collar is conductively coupled to the surrounding earth stata, return currents will be scattered through the strata, as indicated by the dashed lines 138.

Figure 4:
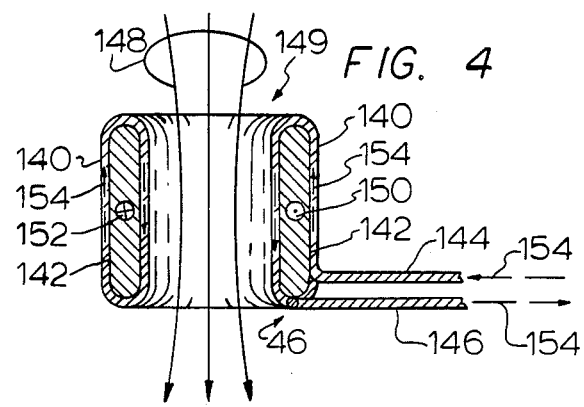
FIG. 4 is a diagram cross-section view of toroidal transformer utilized as a receiver in the down-hole unit of FIG. 2.

A typical sensing toroid 46 is constructed and mounted in a similar fashion (schematically shown in FIG. 4). As with toroid 44, insulated wire forming a coil winding 140 is wrapped around an annular core 142 of magnetic material and the leads 144 and 146 are coupled to the wiring harness 84 for connection to the system 82. The sensing toroid 46 acts as a current detector and responds to a current flow, as indicated at 148, within the axial opening 149 of the toroid by establishing a magnetic field in the core 142. The direction of such field is depicted by arrow head 150 and arrow tail 152. This magnetic field induces an electrical current flow 154 in the coil winding 140 that is proportional to the current 148 passing through the axial opening 149 of the toroid.

Figure 4A:
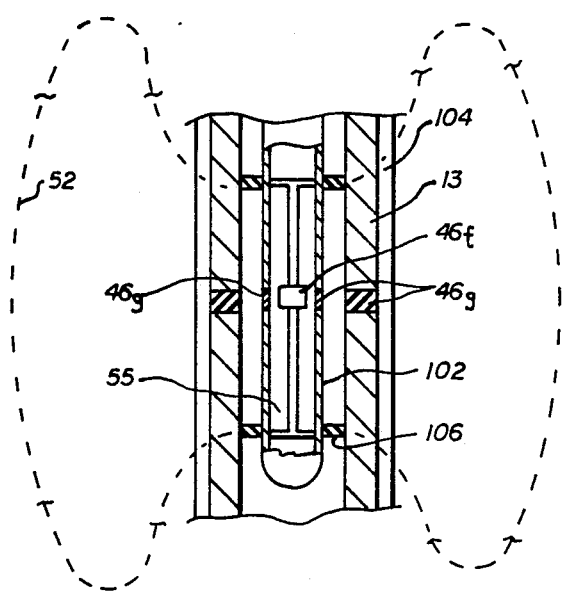
FIG. 4a is a simple diagram of a combination toroidal transformer-insulated gap preferred as a receiver for sensing scattered electrical currents down-hole.

Preferably, referring to FIG. 4a, a combination sensor is used having a small sensing toroid 46t located in a protected environment within the instrument shell 102 (FIG. 2) rather than around the drill collar annular with insulated gaps 46g appropriately located in the drill collar 13 and surrounding walls of the instrument shell 102 for interrupting electrical continuity. Supports 104 and 106 (FIG. 2) securing the instrument shell 102 within the drill collar 13 establish appropriate electrical connections on either side of the annual gap 46g interrupting the electrical continuity of the drill collar 13. Accordingly, all currents 52 propagating above and below the depicted sensor flowing in the drill collar 13 must flow into the modular 40 via the supports 104 and 106 to the instrument shell 102. In this embodiment, the electrical currents reaching the instrument shell are conducted through the axial opening 149 of the toroid via a conduction path 55 dictated by considerations of electrical design rather than by mechanical constraints. For example, it is possible, since the length of the drillstring below the module 40 is usually known, to optimize the effective electrical length of the drill string below the transceiver and excitation toroids 48 and 44 by designing a sensing toroid 46t with an appropriate impedance relative to the inherent capacitance of the isolating annular insulative gaps 46g.

More specifically, the sensing toroid 46 senses a current indicated by the arrows 148 which is a summation of all currents flowing through the surrounding strata and through the surrounding drill string. Well known signal processing techniques may be utilized to eliminate or subtract out the portion of the sensed current attributable to that generated by the excitation toroid 44. It is the distribution of energy of the scattered currents flowing through the strata that provides the valuable data allowing supportable prediction vis a vis the nature and relative spacing of different strata below the tip of the drill string.

For example, phase and amplitude of the signal 154 sensed by the sensing toroid 46 can be compared and analyzed with reference to the current signal 130 input into the excitation toroid 44 (FIG. 3). Signal 154 is proportional to the alternating current 148 at the sensing toroid 46 which, in turn, is composed of (1) alternating currents propagating solely within the drill string; (2) alternating currents propagating to and from the annular region surrounding the drill string below the sensing toroid 46, and (3) alternating currents propagating to and from geological strata in regions ahead of or in front of the drill bit. Both the amplitude of each component of the signal 154 and the extent to which each component is shifted in phase relative to the excitation current 130 are indicative of electrical properties, i.e., the dielectric constant, permittivity, permeability, resistivity, and conductivity, of the medium in which the particular component of the alternating current signal 148 propagates. Thus, any change in either amplitude or phase, or both, of a component of signal 154, and indicates a change in the electrical properties in one or more of the mediums in which the alternating current 148 propagates.

Such changes will initially only be apparent in the component of the signal 154 attributable to the portion of the current 148 propagating to and from geological regions ahead of (in front of) the drill bit. Depending on the relative difference between the electrical properties of the respective regions, or, CONTRAST, and by analyzing such changes historically as well depth increases, it is possible to detect the effects of electrical anomalies at distances ranging 30 or more meters below the drill bit.

Such changes become more apparent, i.e. show an increase in amplitude and phase attributable to that component of the scattered current as the drill bit approaches closer to the anomaly causing the change. The detection of such electrical anomalies in the formation ahead of the drill bit and subsequent investigation of them as the drill string passes through or by them using conventional side viewing sensing techniques allow the strata 36 penetrated by the well to be characterized and compared to similarly investigated geological formations. Such historical data logs will also permit prediction as to the nature and spacing of unpenetrated layers of strata below the drill bit.

All three of the down-hole toroidal transformers 44, 46 and 48 may be of substantially the same configuration in both construction and installation.

The described MWD apparatus utilizes the drill string 12 to establish the telemetry link between the down-hole module 40 and the surface instrumentation 42. Specifically, with reference to FIGS. 5, 6a, 6b, 7a and 7b, the down-hole module 40 and the surface instrumentation 42 each have at least four subsystems; namely, a communication subsystem 156 (and 158), a command and control subsystem 160 (and 162), a data acquisition subsystem 164 (and 166), and a power subsystem (168 and 170). In the down-hole module 40 (shown in FIG. 2), most of the electronic components of the subsystems are contained within a down-hole shell 102. The toroidal transformers 44, 46 and 48, sensors and transducers 76, 78 and 80, the turbine 88, and the alternator 86 are electrically coupled to the electronic components within the shell 102 via high pressure electrical feed-throughs (not shown).

The data acquisition subsystem 164 (FIG. 5) collects and processes signals from the sensing toroid 46, monitoring the currents scattered by the surrounding strata. The data acquisition subsystem 164 also collects and processes signals from other sensors monitoring such things as temperatures in the drill collar 13, drill bit 14, drilling fluid 18, and shell 102; pressures of the drilling fluid within and outside the drill string; the weight and torque on the drill bit; wear; bore-hole deviation/direction; scattered gamma rays and neutrons; and acoustic porosity of the surrounding strata. Some of these parameters can be monitored from within the shell 102, e.g., gamma ray and neutron scattering and bore-hole deviation, while other parameters must be monitored by exterior sensors mounted on the drill collar 13, e.g., pressure sensors 76 and 78, and the strain gages 80.

The down-hole data acquisition subsystem 164 includes a transmitter 172 for driving the excitation toroid 44, and a receiver 174 for processing signals from the sensing toroid 46. Also included are external and internal sensors 176 and 178, and logging instrumentation 180 for gathering other desired data.

Through a selectable frequency oscillator 182 (FIG. 6a) and a power controller 184, the down-hole command and control subsystem 160 selects both frequency and power of the signal for driving the excitation toroid 44. Suitable frequencies range from 2 Hz to 30 MHz. Signals produced by the sensing toroid 46 are amplified and filtered by a receiver 174 sequentially passing through a disconnect relay 188, a pre-amplifier 190, a selective bandpass filter 192, and an automatic gain controlled amplifier 194 to provide a resultant signal.

The down-hole command and control subsystem 160 also scans and formats the data collected by the data acquisition subsystem 164, determines priorities for data communication to surface instrumentation, distributes electrical power to various units within the module 40, controls frequency and power of the carrier signal for sending data to the surface and selects a frequency window from receiving command signals from the surface.

In particular, the down-hole command and control subsystem 160 includes a microprocessor 196 with a programmable read only memory (PROM) 198, a random access memory (RAM) 200, and an electrically erasable programmable read only memory (EEPROM) 202 interconnected in a well known manner to act as a computer and interface to the remainder of the down-hole module through an input/output digital converter 206. Two analog multiplexers 208 and 210 are provided to selectively switch data inputs to the computer. Data from the external and internal sensors 176 and 178 are boosted by a conditional amplifier 212, while data from the receiver 174 is transformed from alternating to direct current signals by a rectifier 214. Operating instructions may be stored in the PROM 198 and the EEPROM 202, or may be down-loaded from the surface unit 42 and stored in the RAM 200.

Power for the operation of the down-hole module 40 is provided by the turbine driven alternator 86, with a battery powered back-up 216. Selection between the two sources of power is accomplished by a power switch 218 that is controlled by the down-hole command and control subsystem 160 in response to an input power sensor 220. When the flow of drilling fluid 18 slows significantly, or stops, the power switch 218 switches to the back-up power unit 216.

The voltage and frequency of the power generated by the alternator 86 can vary widely. Accordingly, it must be regulated, rectified and filtered by a power supply 222 in order to provide "clean power" for distribution to the down-hole electrical/electronic components.

The subject bi-directional telemetry system, i.e., the respective intelligent communications subsystems 156 and 158 of the down-hole module 40 and the surface instrumentation 42 provide the link for transmission of command and data signals between the down-hole module 40 the surface instrumentation 42. Communication is accomplished using a carrier signal of a selected frequency modulated with digital signals containing commands and/or data. The carrier signal is communicated between the down-hole module 40 and surface instrumentation 42 via the conductive drill string 12 and the geological strata. The frequencies of such carrier signals are selectable from a set of predeterminal frequencies (or are variable over a range of frequencies) between 2 Hz and 100 Hz to offset attenuation which typically increases as the well deepens. (Frequency of the carrier signal is normally lowered to offset such attenuation.) Also, different modulation schemes for encoding the digital commands and data signals onto the carrier signal are selected by the respective subsystems 156 and 158 in order to reduce the effects of attentuation and noise on the transmitted signals.

In more detail, command signals encoded onto a carrier signal generated by the surface instrumentation 42 are received by the down-hole communications subsystem 156 through the transceiver toroid 48 and input to a diplexer 222 which functions as a switch to alternatively connect the transceiver toroid to either a command receiver 224 or a data transmitter 226. Both the command receiver 224 and the data transmitter 226 are coupled to the down-hole command and control subsystem 160 for transmission frequency selection and data transfer.

Figure 6A:
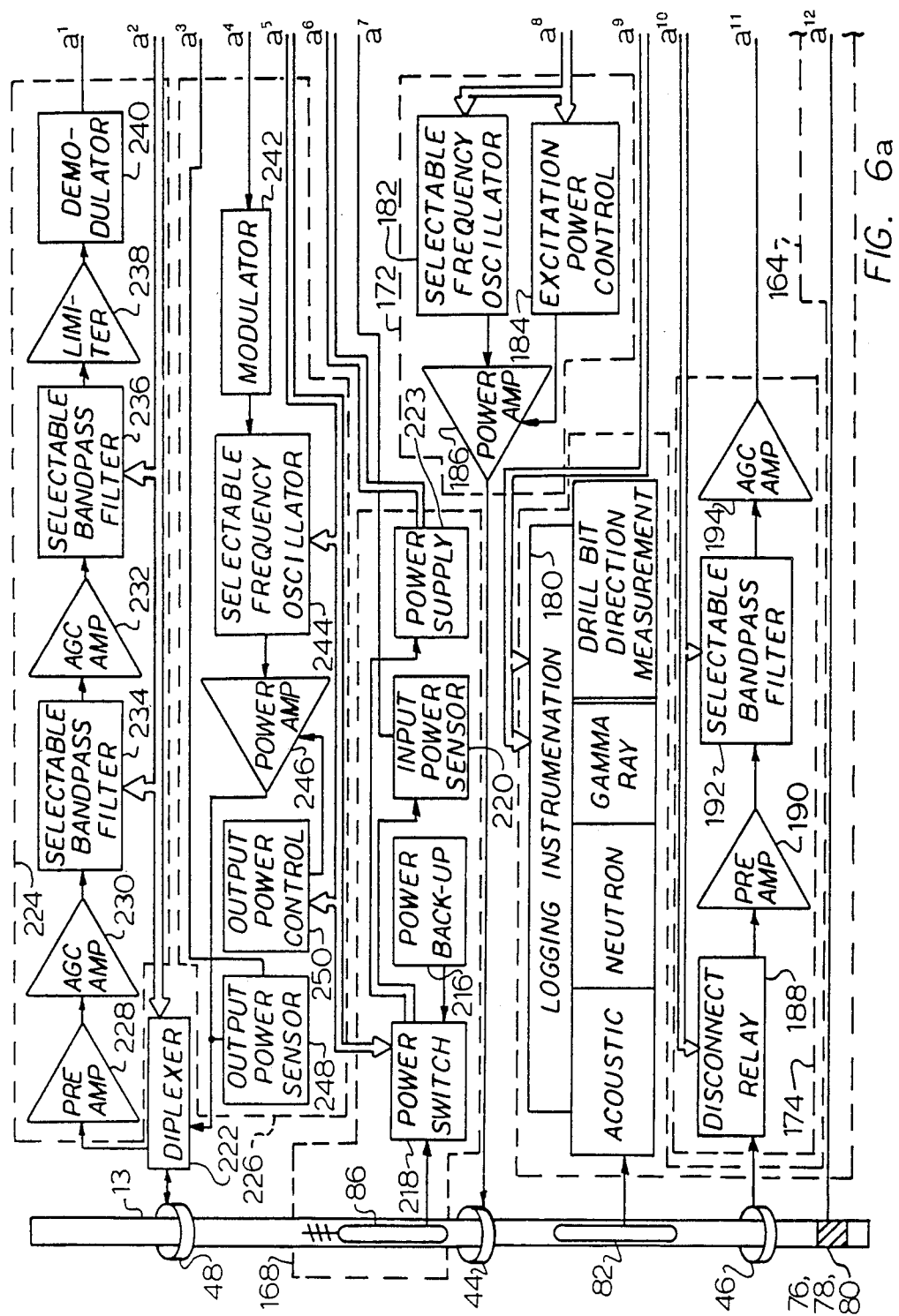
Figure 7A:
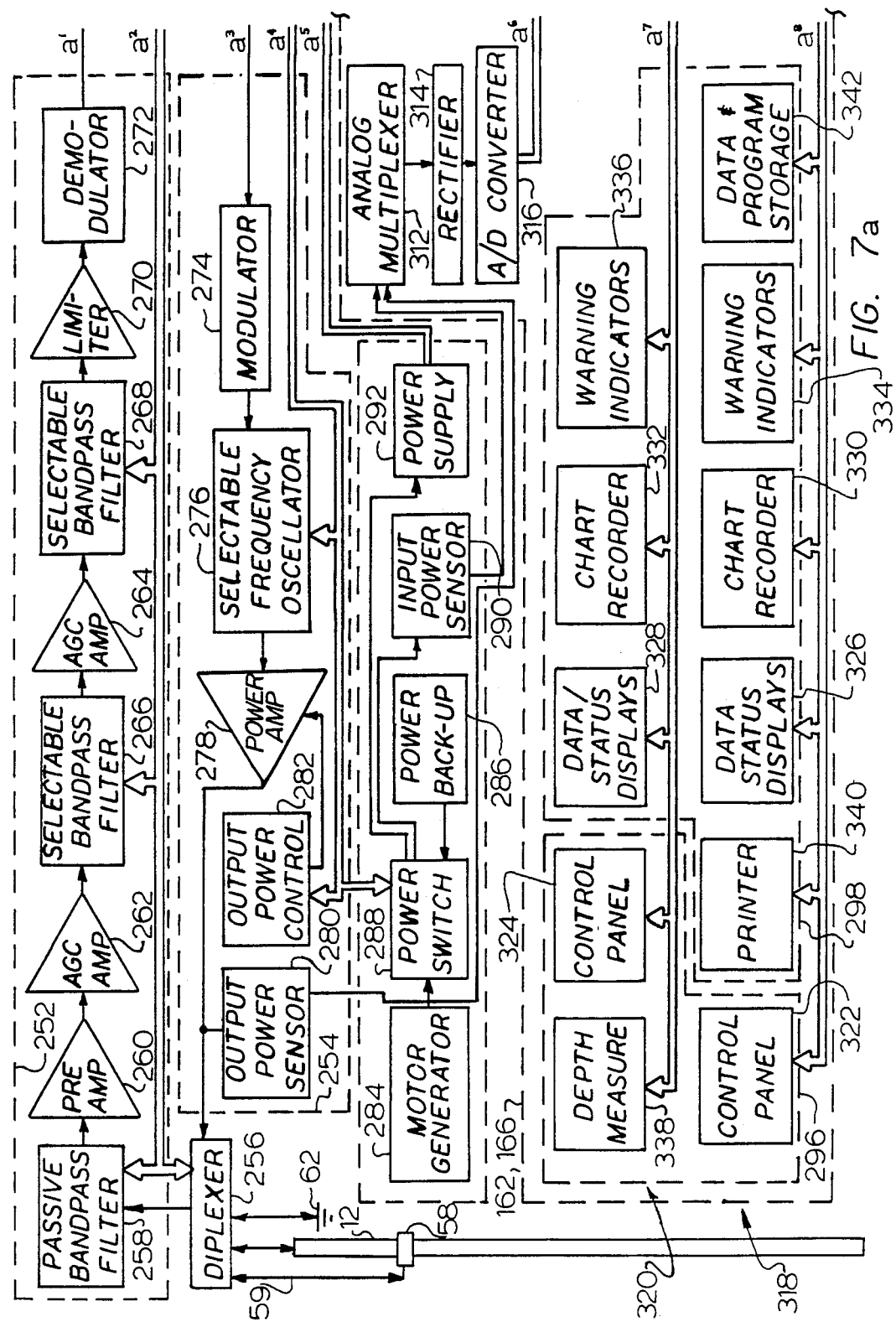

As illustrated in FIG. 6a, the command receiver 224 contains a pre-amplifier 228, two automatic gain controlled amplifiers 230 and 232, two selective bandpass filters 234 and 236, a limiter 238, and a demodulator 240. Functionally, the carrier current generated and modulated by the surface communications subsystem 158 is sensed down-hole by the transceiver toroid 48 and directed by diplexer 222 to the pre-amplifier 228 for amplification. From there, such signals pass through a first automatic gain controlled amplifier 230 and a first selective bandpass filter 234 for filtering in a frequency range determined by the down-hole command and control subsystem 160. Next, the sensed signals pass through a second automatic gain controlled amplifier 232 and a second selective bandpass filter 236 and into a limiter 238. Finally, the sensed signals are input into a demodulator 240 which decodes the digital command/data signals therefrom and inputs such command/data signals into the down-hole command and control subsystem 160 for further action.

Data signals obtained by the down-hole data acquisition subsystem 164 are received by the down hole command and control subsystem 160, analyzed, digitized and input to a data transmitter 226 through a modulator 242 which modulates the output of a selective frequency oscillator 244 determining the frequency of the carrier signal. Continuing, the modulated carrier signal enters a power amplifier 246 for boosting, then passes through the diplexer 222 to the transceiver toroid 48 where it is transmitted to the surface via the drill string and the surrounding strata. An output power sensor 248 monitors the power level of the boosted signal which in turn, is controlled by an output power controller 250 via the down-hole command and control subsystem 160.

The surface communications subsystem 158 is functionally similar to the down-hole communications subsystem including a data receiver 252 for receiving the modulated carrier signal generated by the down-hole communications subsystem 156, and a command transmitter 254 for generating modulated carrier signal for transmission to the down-hole unit 156. A diplexer 256 alternatively couples either the data receiver 252 or the command transmitter 254 between the top of the drill pipe 12 and one or more electrodes 62. Alternatively, the diplexer alternatively couples either the data receiver 252 or the command transmitter 254 to the fourth toroidal transformer 58 for sensing the modulated carrier signal propagating in the underground and drill.

The signals input from dixplexer 256 to data receiver 252 (see FIG. 7a) first pass through a passive bandpass filter 258 then through an amplication and filtering circuit that is identical in form and function to that of the down-hole command receiver 224. Specifically, this circuit includes a pre-amplifier 260, two automatic gain controlled amplifiers 262 and 264, two selective bandpass filters 266 and 268, a limiter 270 and a demodulator 272 all coupled and controlled through the surface data processing system 162. The output of the demodulator, which contains the data from down-hole, is input into the surface data acquisition subsystem 166 for further processing.

The surface transmitter 254 is similar to the down-hole transmitter 226 having a modulator 274, a selective frequency oscillator 276, a power amplifier 278, an output power sensor 280, and an output power control 282 for modulating a carrier signal of selected frequency and power with the command/data signals from the surface data processing system 162 for transmission to the down-hole module 40.

Electrical power for the surface instrumentation 42 is provided by the surface power subsystem 170. A motor generator 284 is the primary source of power and a battery 286 is the back-up source of power back-up. Selection between the two sources of power is accomplished by a power switch 288 that is controlled by the surface data processing system 162 in response to an input power sensor 290. Power conditioning including necessary voltage regulation and noise filtering is provided by a power supply 292. The conditioned power is routed within the surface unit 42 by the surface data processing system 162.

Data acquisition and command and control is accomplished by the surface instrumentation 42 via a surface controller 294 in conjunction with several input and output devices 296 and 298. The data acquisition functions consist of processing measurement data from the data receiver 252 and converting it to a format suitable for output.

Concurrently, the command and control functions include generating command signals programming the down-hole unit 40. The command and control functions also include interfacing to the various surface subsystems for communication with the outside world and for power distribution.

The above functions are provided to the surface controller 294 system by a computer 300 which at least includes a microprocessor 302, a programmable read only memory (PROM) 304, a random access memory (RAM) 306, and an electrically erasable programmable read only memory (EEPROM) 308, all interconnected in a manner well known in the art.

Interfacing between the computer 300 and the remainder of the surface unit 42 is provided by an input/output buffer 310. Signals from the output power sensor 280 and the input power sensor 290 are connected to the I/O buffer 310 through an analog multiplexer 312, a rectifier 314 and an analog to digital converter 316. Operating instructions for the surface controller are either stored in the PROM 304, or the EEPROM 308, or input by the operator, or down-loaded from a conventional program/data memory storage mechanism.

System input and output is provided at two or more locations, principally a logging station 318 and a drill rig station 320 each of which include control panels/stations 322 and 324, data/status displays 326 and 328, chart recorders 330 and 332, and warning indicators 334 and 336. Additionally, the drill rig station 320 includes a sensor 338 monitoring well depth. The logging station 318 includes printers 340 and data diplay devices and program/data storage/memory devices 342.

Figure 8:
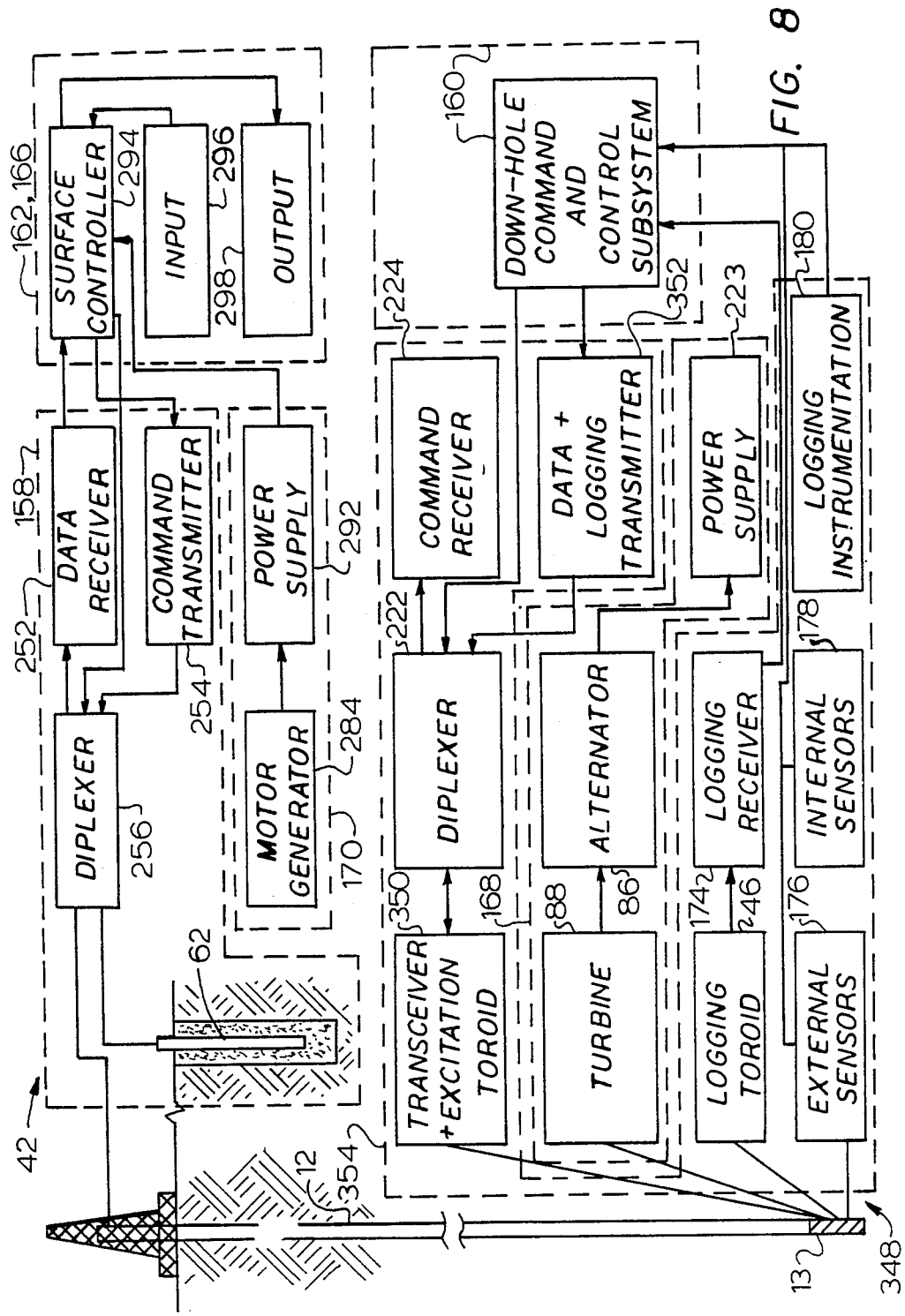
FIG. 8 is a functional diagram of an alternative embodiment of an MWD system employing two insulated gaps rather than toroidal transformers in the down-hole unit for obtaining data and communicating with surface instrumentation.

In the preferred embodiment, shown in FIG. 8, the down-hole module 348 includes a single transceiver and excitation insulated gap 350 which performs both the functions of the excitation and transceiver toroids 44 and 46 for both communications and excitation. In this embodiment, a data and sensing transmitter 352 is operable for the generation of both data communication signals and excitation signals at relatively low frequencies ranging, for example, from 2 Hz to 100 Hz. All communications and data acquisition related functions are combined into a single communications and data acquisition subsystem 354 which combines the functions of the communications subsystem 156 and the data acquisition subsystem 164 of the previously described embodiment except that the transceiver and excitation gap 350 is connected on a time-sharing basis between the command receiver 224 and the transmitter 352 for sequentially driving the gap 350 to produce excitation currents or carrier signals. Thus, data transmission, command reception, and excitation functions occur sequentially, not simultaneously. Also for the system diagrammed in FIG. 8, utilizing a single insulated gap 350 for generation of both the excitation currents and the carrier signals, the scattered currents propagating in the underground strata are preferentially sensed using the combination of an insulating gap(s) 46g with a small sensing toroid 46t located within the instrument shell 82 rather than around the drill collar.

In particular, referring back to FIGS. 2 and 4a, annular insulated gaps 46g are appropriately located in the drill collar 13 and surrounding walls of the instrument shell 82 for interrupting electrical continuity to thereby induce all currents propagating up and down the drill string below the sensing toroid 46 to flow through its axial opening 149. The supports 104 and 106 securing the instrument shell 82 within the drill collar 13 establish appropriate electrical connections on either side of the annular gap 46g interrupting the electrical continuity of the drill collar 13. In this embodiment, the entire lower portion of the drill string below the transceiver and excitation insulated gap 350 is available for inducing both carrier signals and excitation currents in the underground strata without the disadvantage of the inherent impedance of a large sensing toroid disposed around the drill collar 13, or the disadvantage of an electrical discontinuity a relatively short distance down the drill-string in the case of an insulated gap sensor. It is also feasible with the gap-toroid sensor, since the length of the drill-string below the transceiver and excitation insulated gap 350 is usually known, to optimize the effective electrical length of the drill string below the gap 350 by designing a sensing toroid 46t with an appropriate impedance relative to the inherent capacitance of the isolating annular insulative gaps 46g. The remainder of the down-hole measurement unit 348 diagrammed in FIG. 8 functions as previously described.

Figure 9:
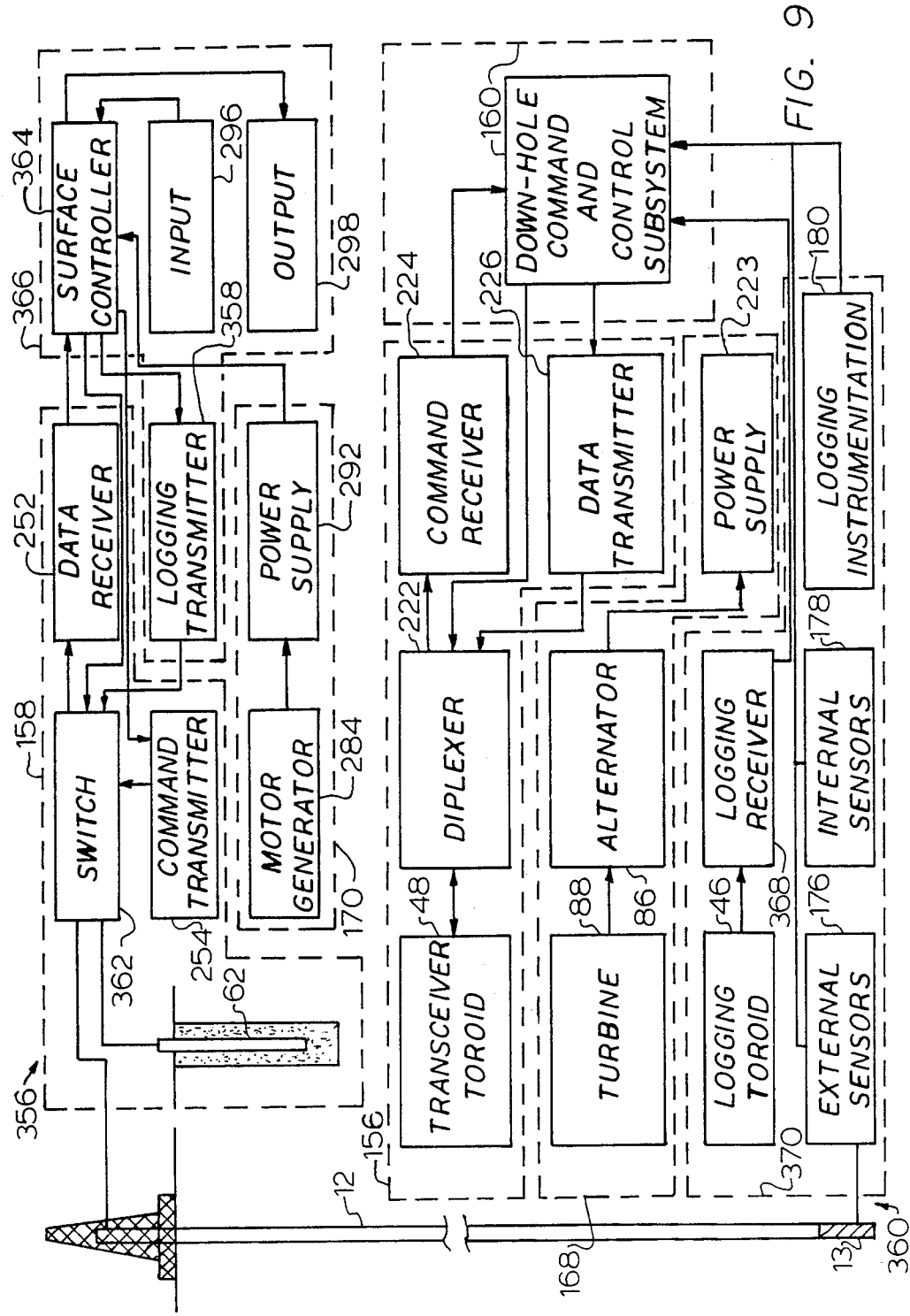
FIG. 9 is a functional diagram of an alternative embodiment of an MWD system that uses surface excitation rather than the down-hole excitation to obtain down-hole data.

In the alternative embodiment, shown in FIG. 9, the surface instrumentation 356 includes a excitation transmitter 358 for generating excitation currents at ground surface. Accordingly, a switch 362 sequentially connects the data receiver 252, the command transmitter 254, and the excitation transmitter 358 to the drill pipe 12 and electrode 62 for reception of data, transmission of commands, and transmission of excitation currents. Frequency and power of the excitation signals are again determined by a surface controller 364 according to stored operating instructions or operator input. The combination of the excitation transmitter 358 and the surface controller 364, and the input and output devices 296 and 298, comprise the surface command and data acquisition subsystem 366. Apart from the addition of the excitation transmitter 358, the surface command and data acquisition subsystem 366 is identical to the previously described surface command and data acquisition subsystems 162 and 166.

In this embodiment, excitation signals transmitted into the ground, induce signals sensed by the sensing toroid 46 as previously described. Since the transmission path is long, the excitation signals should be of relatively low frequency to limit signal attenuation. Apart from the down-hole excitation transmitter 172 and excitation toroid 44, the down-hole measurement unit 360 functions similarly to the previously described down-hole unit 40.

Figure 13A:
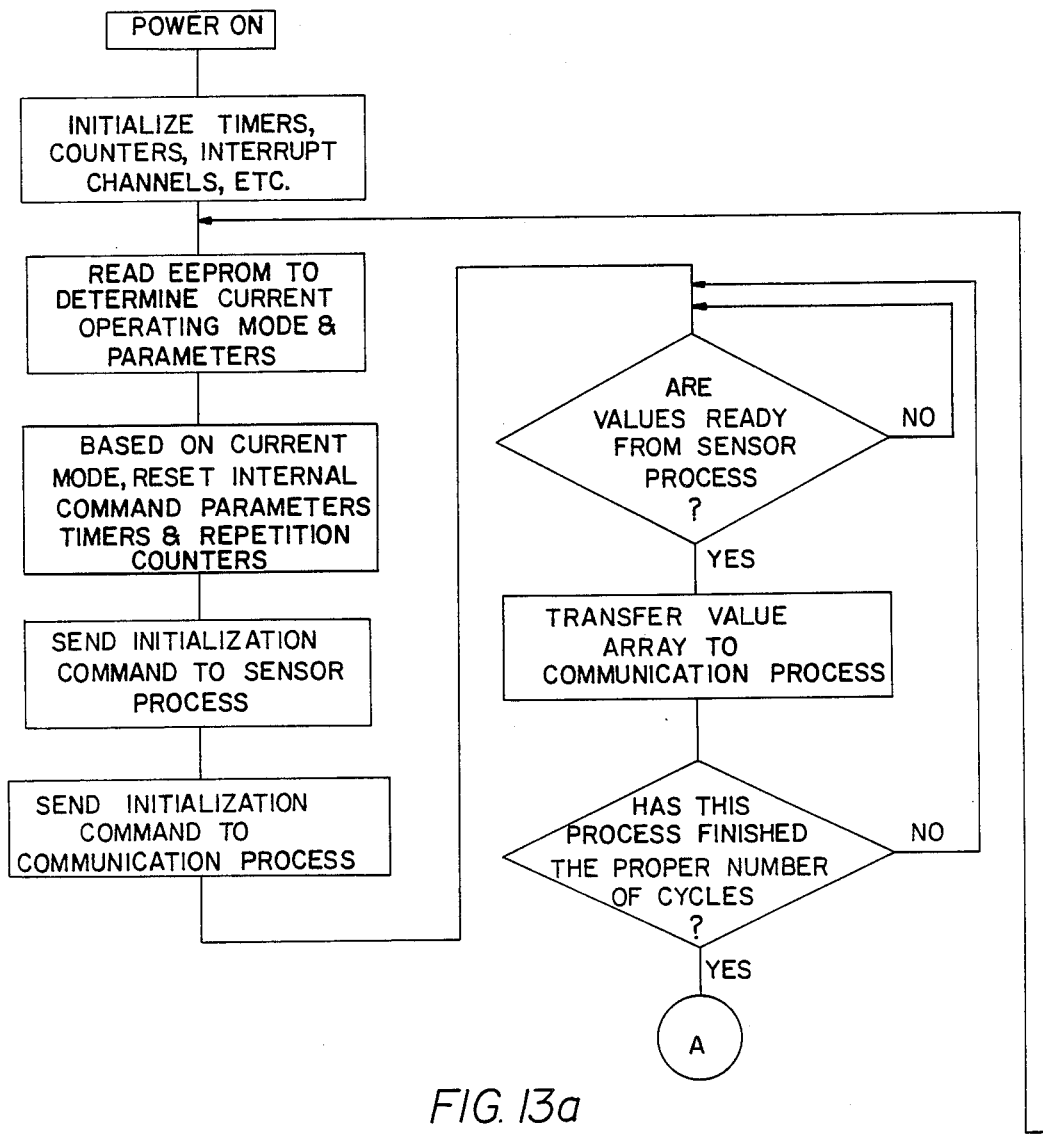
FIGS. 13a through 18b are flow charts illustrating operation of the processes of the present invention implemented in the surface computer and down-hole computer of the preferred embodiments.
Figure 13B:
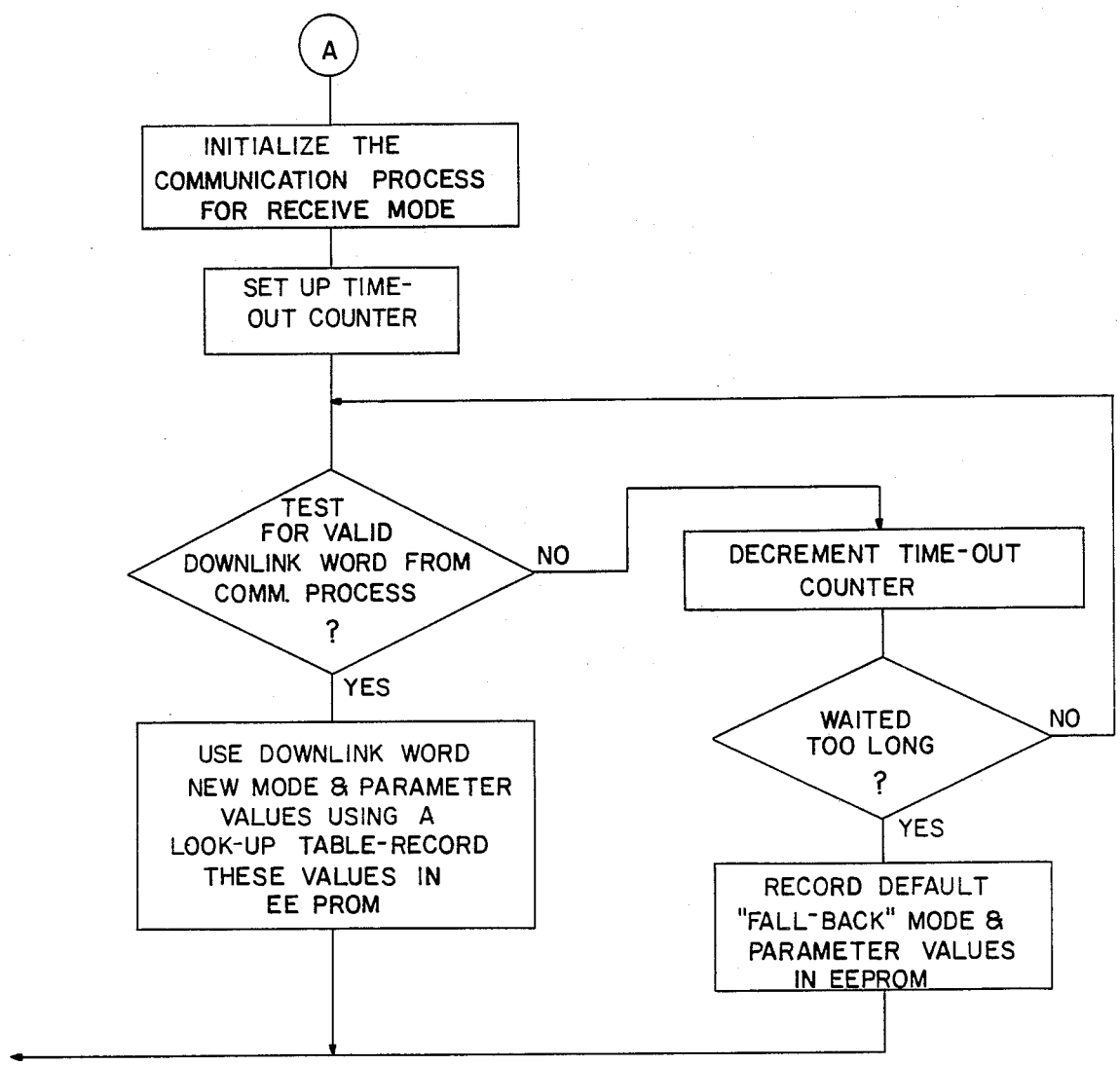

Flow chart #1, shown in FIGS. 13a and 13b illustrates one of three processes that are running simultaneously in the downhole computer 160. That depicted in Chart #1 is the master process which initiates the others and provides a coordination function in passing data and parameters from the sensor process to the communication process. It also provides the various controls and switches necessary to change communication modes when that is required, either due to a direct command from the surface during downlink, or due to a loss of the downlink communication channel.

The timing of uplink transmissions and the insertion of periods dedicated to the receipt of a downlink message is controlled by this process. When a downlink is expected, the command process interrupts the communication process, by resetting it, and forces the communication process to switch into a receive mode. Otherwise, communication with other processes takes place using "semaphores" to pass commands.

Initial operating parameters for the system are retrieved by this process from non-volatile EEPROM memory. In this fashion, the tool always "wakes up" in a known state. The contents of the EEPROM can be controlled in a variety of ways. Some of the parameters can be factory loaded and not changed during normal operation; some can be set, through the communication process, during downlink; and some, principally the operating modes, are stored there by this command process during normal tool operation. In this way, the tool is able to bridge the gaps during which power is removed without losing the coherence of its operation.

Figure 14:
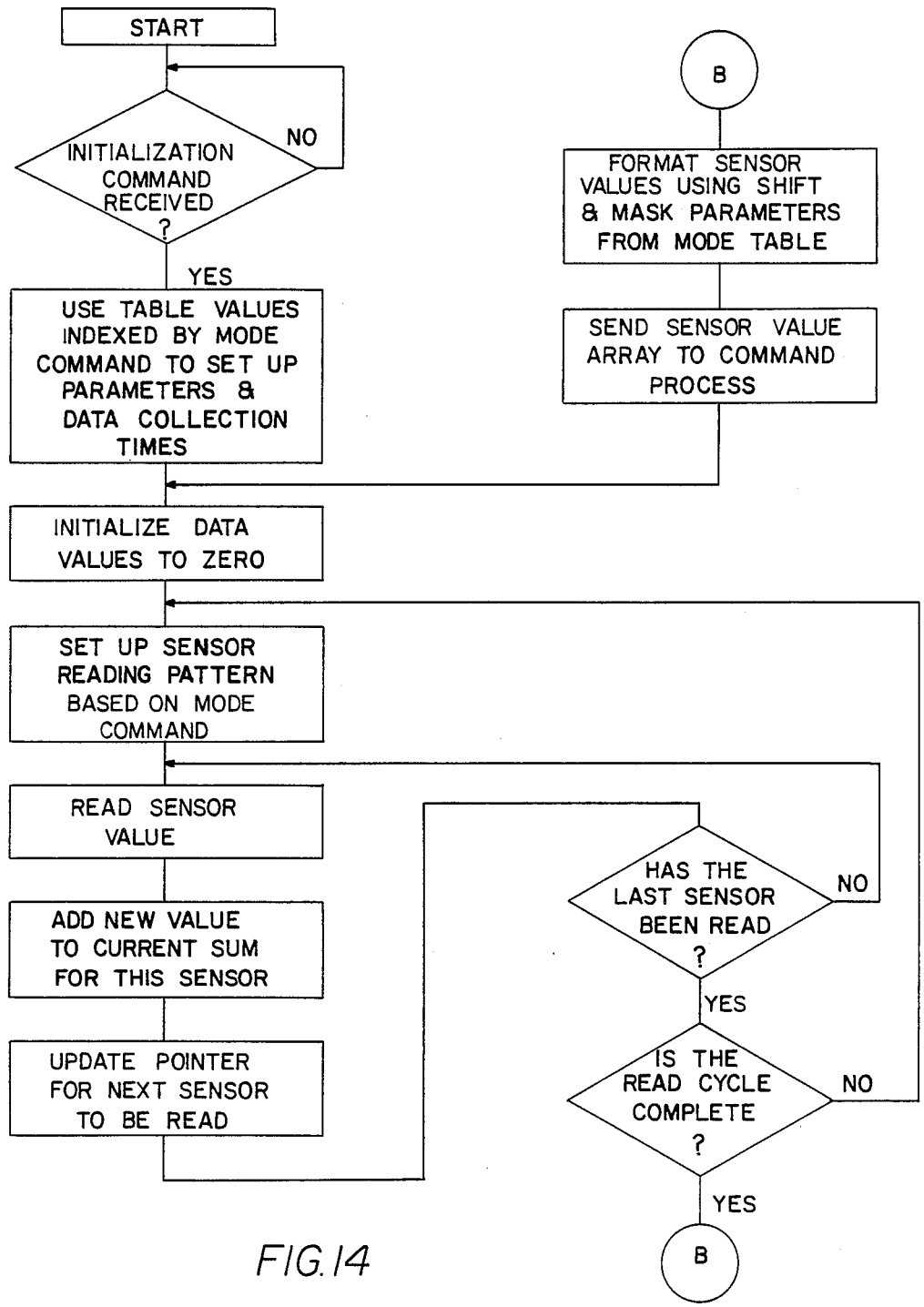

Flow chart #2, shown in FIG. 14, illustrates the second process running in down-hole computer 160. The sensor process is a straight forward data gathering routine which collects data from each sensor and averages them together for a period of time that matches the uplink transmission cycle of the communication process. This routine is also responsible for formatting and scaling the data in a manner expected by the communication process and the surface computer.

Figure 15A:
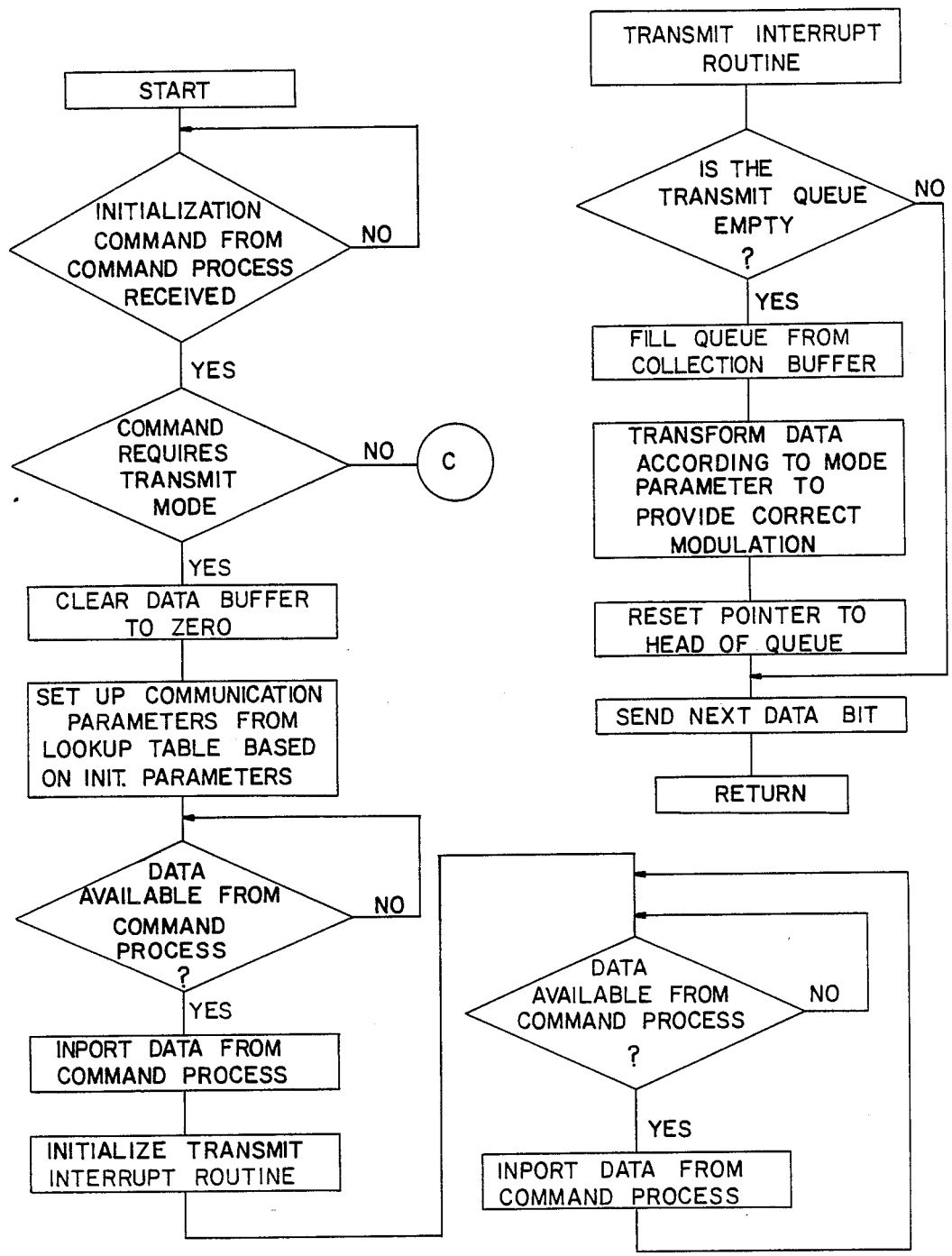
Figure 15B:
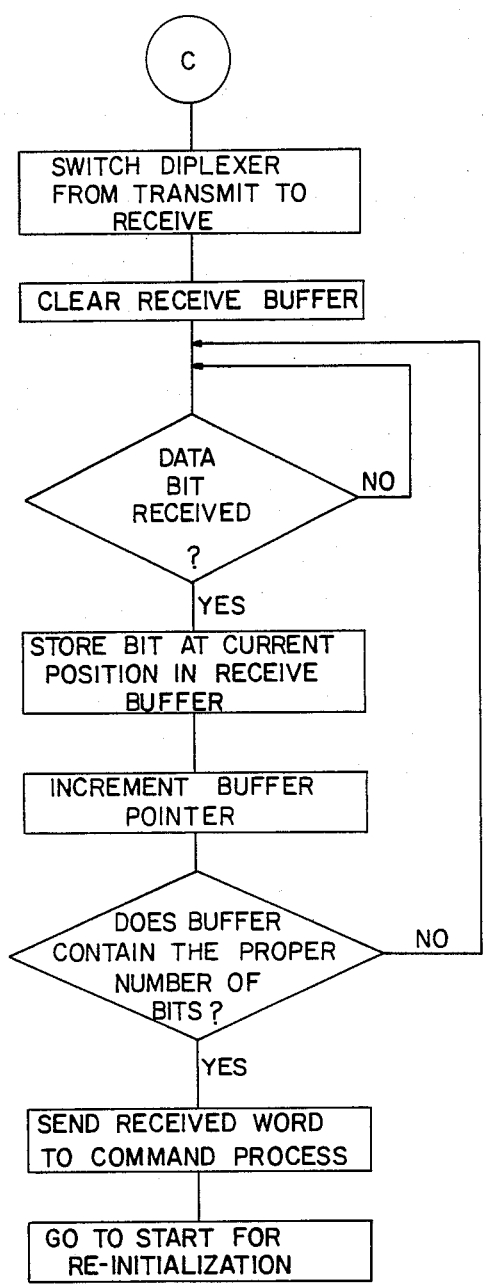

Flow Chart #3, depicted in FIGS. 15a and 15b, illustrates the third process running in down-hole computer 160. The communication process accepts the formatted data from the sensor process (via the command process) and arranges them into a packet for transmission. This packet is strictly defined for each mode of communication. It contains data and error detection and correction information added by the communication process.

If for any reason data are not available from the sensor process, the communication process fills in which data from previous transmissions.

This process operates indefinitely until interrupted by the comamnd process which forces the communication process to restart and go through another initialization process. When a downlink communication is anticipated, this mechanism is used to force the communication process to convert to the receive mode.

Figure 16:
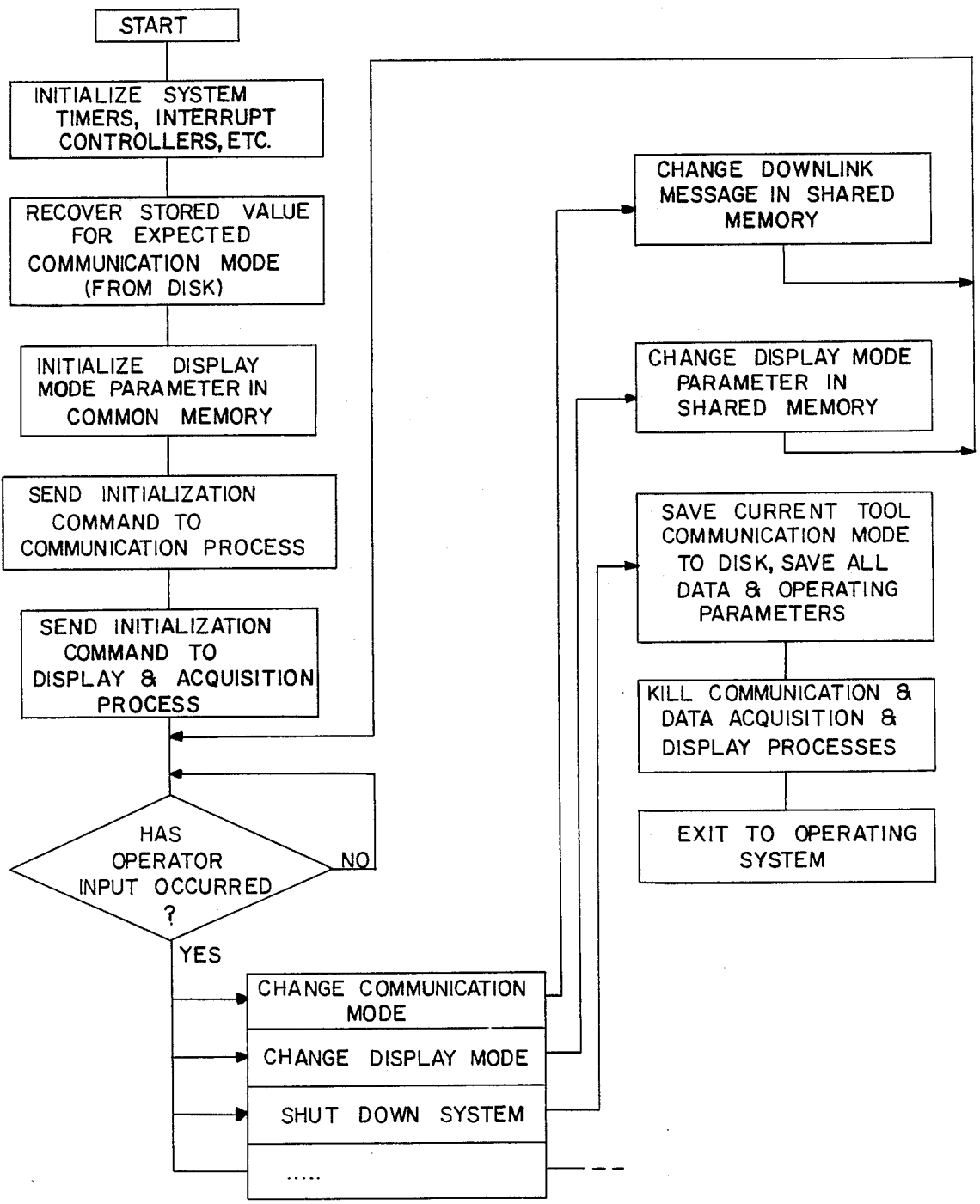

Flow Chart #4 (FIG. 16) illustrates the process implemented in the surface command and control subsystem 162. As in the downhole system, three processes run simultaneously in the surface computer 300. Depicted in FIG. 16 is the master process responsible for initiating and controlling the other two. Once operation has begun, its only major function is to interface with the human operator responsible for controlling the system. Communication and control of the other processes takes place through the control of parameters stored in shared memory.

Figure 17:
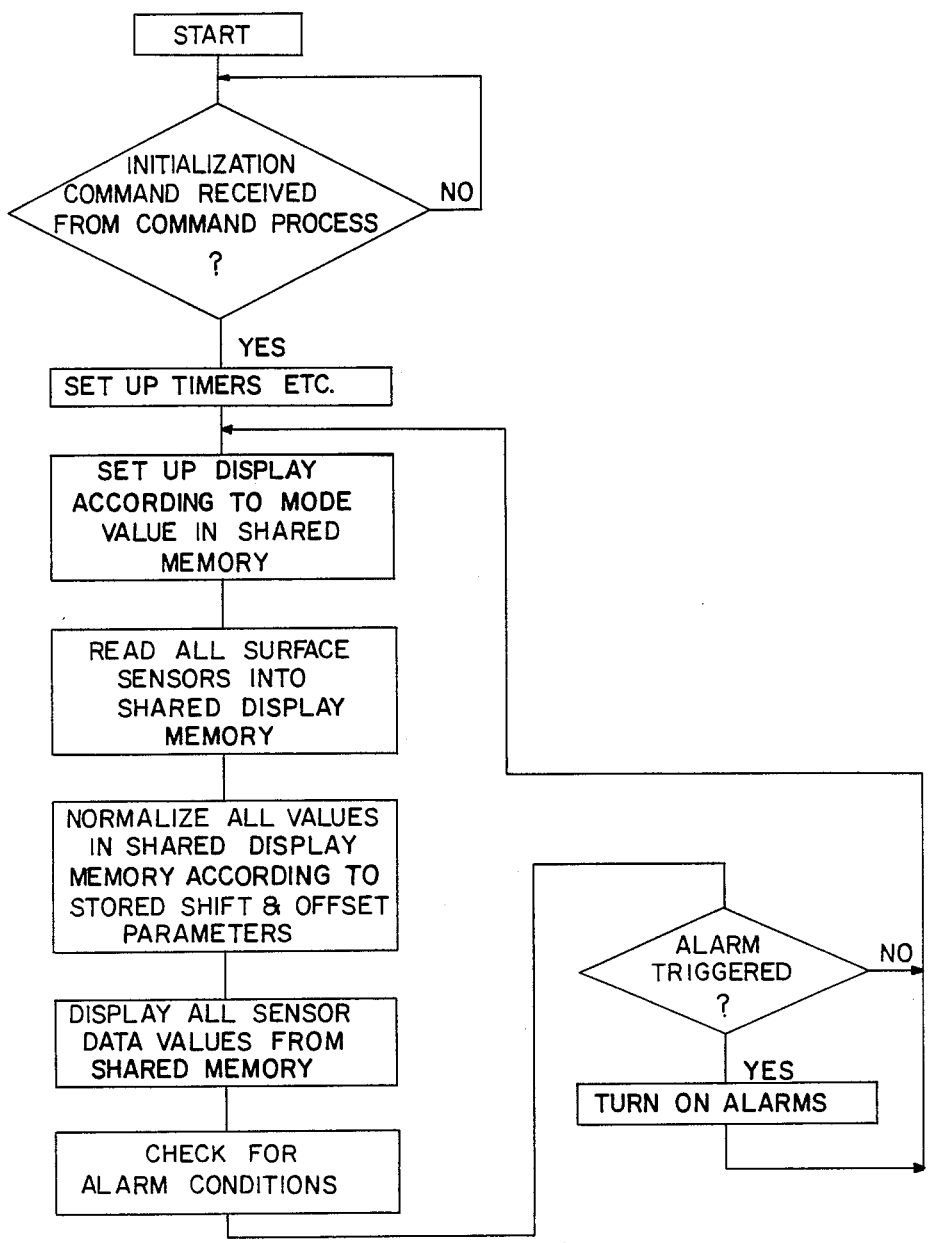

Flow Chart #5, shown in FIG. 17, depicts the second process running in surface computer 300. The surface data acquisition and control process is straightforward. Surface sensor data are collected directly by this task and the preprocessed values are stored in display memory along with the values put there by the communication process resulting from uplink transmissions from the downhole tool.

Regardless of the source of data, each datum is normalized by this process both to remove the compression applied by the downhole tool, where necessary, and to provide calibrations based on stored tables of information corresponding to the particular detectors used in the surface installation and in the downhole tool.

Figure 18A:
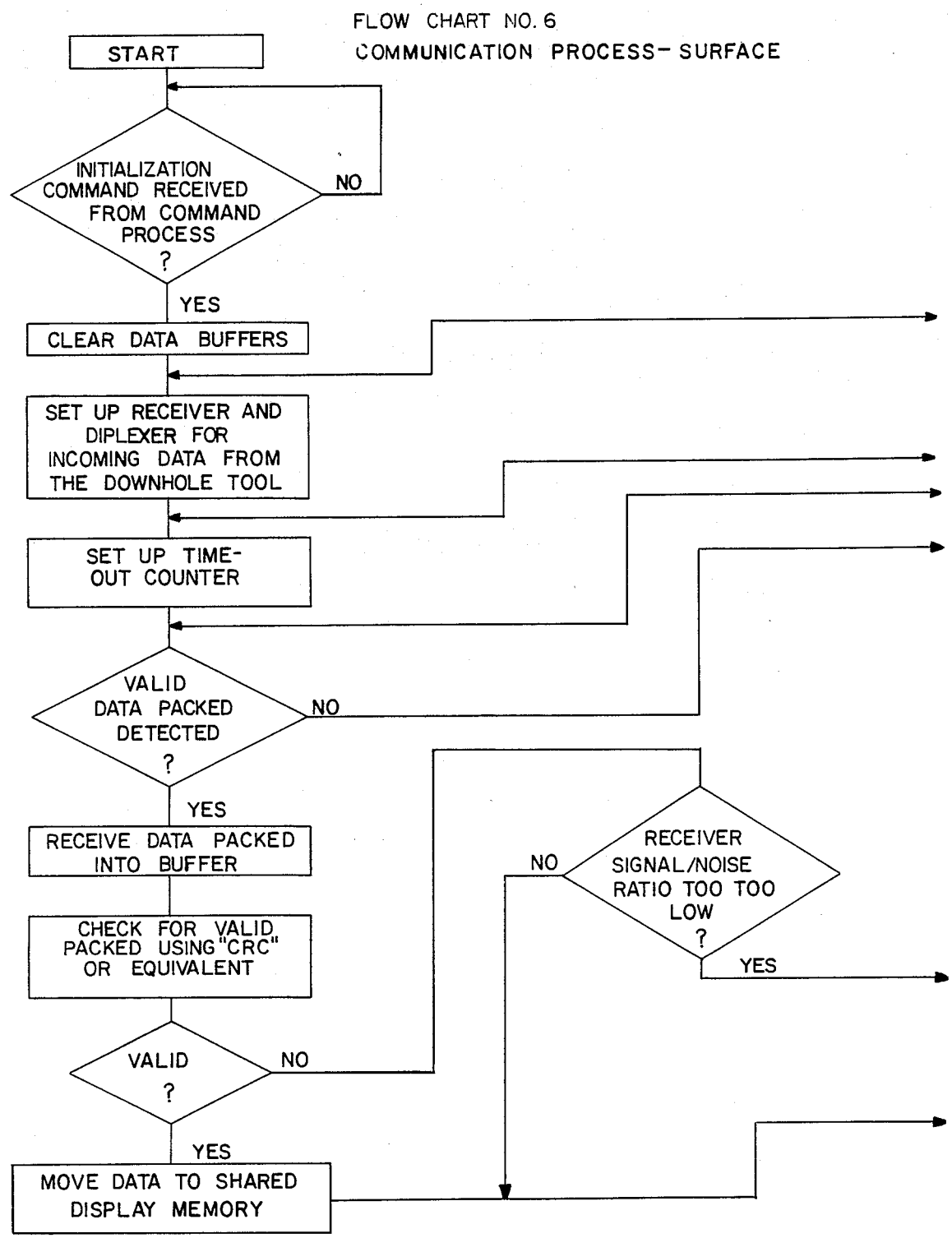
Figure 18B:
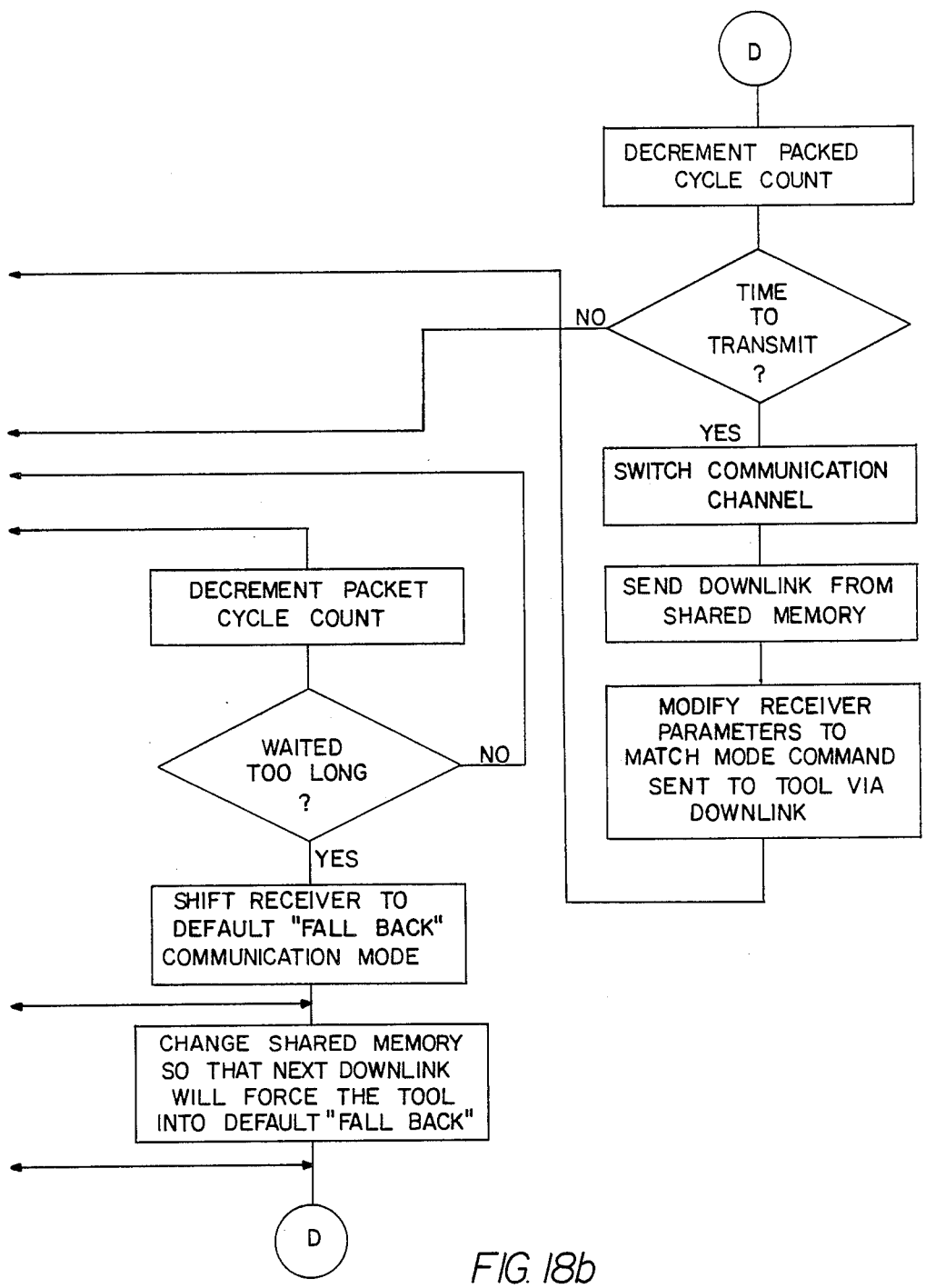

Flow Chart #6, shown in FIGS. 18a and 18b, illustrates the third process running in surface computer 300. The surface communication process receives the data from the downhole tool and checks their validity. It also provides the timing and control function necessary to provide downlink commands to the downhole tool at appropriate moments.

Initially, the system comes alive expecting the downhole tool to be in the same mode it was last in. In the event that the downhole tool has changed modes for any reason, this process must detect that change and make appropriate modifications to the receiver channel and process software.

Also, in the event that the tool's signal-to-noise ratio is such that a loss of signal is anticipated, this process must modify the next downlink message to force the tool to go into a more robust mode, either at a lower frequency or with a simpler modulation method. By passing appropriate messages to shared memory, this process can control the downlink message as well as the configuration changes required in the rest of the system to accommodate a new communication mode.

Referring now to FIG. 10, an additional feature of the present invention enhancing its flexibility are passive couplers 376 which are incorporated into the drill string 12 for minimizing transmission signal attenuation at higher frequencies maximizing data/command transfer rates. Complete descriptions of both the structural and functional features of such passive couplers 376 appear in co-pending application, Ser. No. 06/429,823, entitled, "Apparatus and Method For Logging Wells While Drilling", filed Sept. 9, 1982.

The present invention may also include active repeaters 396 to overcome the effects of signal attenuation (see FIGS. 11 and 12). In this embodiment, a relay toroid 398 is mounted on a coupling unit 399 in a fashion similar to the transceiver toroid 48. A relay shell 401 is suspended within the coupling sub 399 in a fashion similar to the module shell 102 described earlier. Positioned within the relay shell, a relay electronics unit 400 is provided containing a diplexer 402, a relay receiver 404, a relay controller 406, a relay transmitter 408, and a power supply 410. Electrical connection between the windings of the relay toroid 398 and the relay electronics unit 400 is provided by a cable 412.

In operation, the relay toroid 398 senses signals conveyed through the drill string 12. The relay receiver 404 is connected to the relay toroid 398 through the diplexer 402 and amplifies and filters the sensed signals for input to the relay controller 406. These signals are delayed/stored by the relay controller 406 for a period of time, then output to the relay transmitter 408 for transmission up the drill string by the relay toroid 398. Power for the relay circuitry is provided by either batteries or a turbine/alternator combination as in the down-hole module 40.

With either a passive or active coupler system in place, the primary function of the respective down-hole and surface data processing systems (computers) in controlling communications is to determine the particular frequencies and signal modulation schemes that produce the maximum signal at the respective down-hole and surface receivers and then select those particular frequencies as the carrier frequencies for the data signal current and command signal current streams.

The invented dynamic telemetry system has been described with respect to representative, schematic and exemplary embodiments of MWD well logging tools. Modifications and changes may be made to the invented system adapting it to other MWD well logging tools or subterranean diagnostic systems not described herein which include a pipe string connecting between ground surface and an underground module without departing from the spirit and the scope of the invention as set forth in the appended claims.

I claim:

1. A method for communicating data from down-hole sensing devices contained in a down-hole module incorporated into a conductive drill string to ground surface comprising the steps of:

(a) generating a first alternating electromagnetic (EM) transmission current in the drill string and underground strata with an electrical current generator disposed within the module;

(b) detecting the frequency of said generated first EM transmission current that produces a particular EM transmission current level at ground surface;

(c) setting said electrical current generator to generate a second EM transmission current at the detected frequency;

(d) converting analogue data signals developed by said down-hole sensing devices into digital electrical data signals;

(e) inputting said digital data signals into a down-hole microprocessor means located in the down-hole module, and logically operating on said digital data signals according to a first program stored in a first programmable read only memory (PROM), a first random access memory (RAM), and a first electrically erasable programmable read only memory (EEPROM) to convert such digital signals into digital transmission data signals;

(f) modulating said second EM transmission current with said digital transmission data signals;

(g) detecting the modulated second EM transmission current at ground surface;

(h) converting the detected modulated second EM transmission current into a digital data string;

(i) inputting said first digital data string into a surface data processor means and logically operating on said digital data string according to a second program stored in a second programmable read only memory (PROM), a second random access memory (RAM) and a second electrically erasable programmable read only memory (EEPROM) to convert said digital data string into analogue data signals reflecting conditions of the down-hole strata detected by said down-hole sensing devices.

2. The method of claim 1 and further including the steps of:

(j) generating a first alternating electromagnetic (EM) control current in the drill string and underground strata near the surface with a surface electrical current generator;

(k) detecting the frequency of the generated first EM control current that produces a particular EM control current in the down-hole module;

(l) setting said surface electrical current generator to generate a second EM control current at the detected frequency;

(m) inputting digital programing signals into said surface data processor means and logically operating on said digital programing signals according to third programs stored in said second programmable read only memory (PROM), said second random access memory (RAM) and said second electrically erasable read only memory (EEPROM) to convert such digital programing signals into digital instructions signals;

(n) modulating said second EM control current generated at ground surface with said digital instruction signals;

(o) detecting the modulated second EM control current down-hole in the down-hole module;

(p) converting the detected modulated second EM control current into an instructional digital data string;

(q) inputting said instructioal digital data string into said down-hole microprocessor means and logically operating on said instruction digital data string according to programs stored in said first programmable read only memory (PROM), said first random access memory (RAM) and said first electrically erasable programmable read only memory (EEPROM), and converting said instructional digital data string into a set of instructions to said down-hole microprocessor for controlling the collection of said analogue data signals from said down-hole sensing devices, generation of said EM transmission current, and modulation of said EM transmission current with said digital transmission data signals.

3. The method of claim 2 wherein the steps of detecting the frequency of the generated EM transmission current that produces said particular EM transmission current at ground surface, (step b), and frequency of the generated EM control current that produces said particular EM control current in the down-hole module (step k) further include the steps of:

(i) generating an EM alternating current with the surface electrical current generator at a frequency $f_i$ contingent upon receipt of a periodic acknowledgement signal, (ii) receiving EM currents down-hole across a bandwidth $B_i$, (iii) sensing whether EM alternating currents received are within the bandwidth $B_i$, (iv) periodically generating an EM alternating current down-hole with the electrical current generator in the down-hole module at the frequency $f_i$ of the EM alternating currents received, (v) digitally modulating the periodically generated EM alternating current produced down-hole with an acknowledgement signal contingent upon continuous receipt of the EM alternating current at the frequency $f_i$ for a selected period, (vi) receiving and demodulating the digitally modulating the periodically generated EM alternating current produced down-hole at ground surface to provide the periodic acknowledgement signal, (vii) switching the frequency of the EM alternating current produced by the surface electrical current generator to successively lower frequencies is $f_x$ and switching the bandwidth at which EM currents are received down-hole to successively lower bandwidths $B_x$ in an absence of receipt of a periodic acknowledgement signal until successive acknowledgement signals are received, the frequency of EM alternating currents then being generated by the surface generator being the frequency of the desired EM control and transmission currents.

4. The method of claim 2 wherein the steps of detecting which frequency of the generated EM transmission current that produces said particular EM transmission current at ground surface, (step b), and which frequency of generated EM control current that produces said particular EM control current in the drill collar module (step k) further include the steps of:

(i) generating an electromagnetic (EM) alternating current with a first one of the down-hole and surface electrical current generators at a frequency $f_i$ chosen from a predetermined set of frequencies $f_1$, $f_2, \ldots f_n$ according to a preset start-up program, (ii) detecting EM currents at ground surface and down-hole across a bandwidth $B_i$ corresponding to the frequency $f_i$, chosen from a predetermined set of bandwidths $B_1, B_2, \ldots B_n$ according to a preset start-up program, (iii) sensing whether the EM alternating currents received at ground surface and down-hole are within the bandwidth $B_i$, (iv) periodically generating a second EM alternating current with the other (second) of the ground surface and down-hole electrical current generators at the frequency $f_i$ of the EM alternating currents received, (v) digitally modulating the periodically generated second EM alternating current with an acknowledgement signal contingent upon continuous receipt of the EM alternating current generated by the first generator at the frequency $f_i$ for a selected period, (vi) receiving and demodulating the digitally modulating the periodically generated second EM alternating current at ground surface and down-hole to provide the necessary periodic acknowledgement signal, (vii) switching the frequency of the EM alternating current produced by the first electrical current generator to successively lower frequencies $f_x$ chosen from the predetermined set of frequencies $f_1, f_2, \ldots f_n$ according to the preset start-up program, and switching the bandwidth for receiving EM alternating currents to successively lower bandwidths $B_x$ corresponding to the frequency $f_x$, chosen from a predetermined set of bandwidths $B_1, B_2, \ldots B_n$ according to the preset start-up program in the absence of a periodic acknowledgement signal until successive acknowledgement signals are received, the frequency of EM alternating currents then being generated by the down-hole generator being the frequency of the desired EM control and transmission currents.

5. The method of claim 2 wherein the steps of detecting which frequency of the generated EM transmission current that produces said particular EM transmission current at ground surface, (step b), and which frequency of generated EM control current that produces said particular EM control current in the drill collar module (step k) further includes the step of:

(i) sweeping a range of frequencies with one the generated EM transmission current and control currents;

(ii) measuring the current drawn from the particular electrical generator as the particular generated EM current sweeps through the frequency range to find a particular frequency for which a maximum current is drawn, that frequency being the desired frequency for both the EM transmission and control currents.

6. The method of claims 3, 4 or 5 wherein after setting the respective electrical current generators to generate the EM transmission and control currents at said particular frequency $f_1$ including the further the steps of:

(t) switching the frequency of the EM alternating current produced by the particular electrical current generator to successively frequencies $f_2, f_3, \ldots f_z$, while simultaneously (u) switching the bandwidth for receiving the particular EM alternating current produced to bandwidths $B_2, B_3, \ldots B_z$, (v) verifying receipt of the particular EM alternating currents at the respective frequencies with the particular periodically generated EM alternating current digitally modulated with the acknowledgement signal, (w) remembering the particular frequencies and bandwidths for which acknowledgement signals were received, and (x) upon loss of an acknowledgement signal, simultaneously switching (i) the respective electrical current generators to generate the EM transmission and control currents, and (ii) the bandwidths of the respective receivers to receive at one of the particular frequency $f_z$ for which an acknowledgement signal has been received.

7. The method of claim 6 wherein the respective frequencies $f_2, f_3, \ldots f_z$ and bandwidths $B_2 B_3 \ldots B_z$ are incrementally lower than $f_1$ and $B_1$.

8. The method of claim 6 wherein the respective frequencies $f_2, f_3, \ldots f_z$ and bandwidths $B_2 B_3 \ldots B_z$ are incrementally higher than $f_1$ and $B_1$.

9. An electromagnetic (EM) wave telemetry system for communicating data from down-hole sensing devices contained in a down-hole module in a very deep well to a ground surface station comprising, in combination:

(a) an electrically conductive pipe string mechanically coupling the down-hole module to the surface station;

(b) a down-hole electrical current generator contained in said down-hole module for generating an alternating electromagnetic (EM) transmission current in the pipe string and underground strata;

(c) module frequency control means operatively coupled to said down-hole current generator for controllably causing said down-hole current generator to generate EM transmission currents over a range of frequencies;

(d) surface receiver means for detecting which particular frequency of the EM transmission currents generated by said down-hole current generator produces an EM transmission current having a first particular characteristic as detected at ground surface;

(e) a surface electrical current generator for producing a first EM transmission current in said pipe string and underground strata corresponding in frequency to that of the detected EM transmission current having said first particular characteristic;

(f) down-hole receiver means for receiving said first EM transmission current generated by said surface generator and for causing said down-hole current generator to generate a second EM transmission current at the frequency of said detected EM transmission current;

(g) analogue-to-digital (A/D) means for converting analogue data signals developed by said down-hole sensing devices into digital electrical data signals;

(h) down-hole microprocessor means located in said down-hole module for receiving said digital data signals and for logically operating on said digital data signals according to a first program stored in a first programmable read only memory (PROM), a first random access memory (RAM), and a first electrically erasable programmable read only memory (EEPROM) to convert said digital data signals into digital transmission data signals;

(i) down-hole modulator means for modulating said first EM transmission current with said digital transmission data signals, said surface receiver means being operative to detect the modulated first EM transmission current at ground surface;

(j) surface demodulator means for receiving output signals developed by said surface receiver means and for converting the detected modulated EM transmission current into a digital data string;

(k) a surface data processor means for receiving and logically operating on said digital data string according to a second program stored in a second programmable read only memory (PROM), a second random access memory (RAM), and a second electrically erasable programmable read only memory (EEPROM) to convert said digital data string into analogue data reflecting down-hole conditions detected by said down-hole sensing devices.

10. The system of claim 9 further including:

(l) surface frequency control means operatively coupled to said surface current generator for controllably causing it to generate EM control currents over a range of frequencies;

(m) a down-hole receiver means for detecting which frequency of the generated EM control currents produces an EM control current having a second particular characteristic as detected in said module, said down-hole electrical current generator producing a periodic first electromagnetic (EM) control current in said pipe string and underground strata corresponding in frequency to that of the detected EM control current having said second particular characteristic;

(n) means for receiving said first EM control current generated by said down-hole electrical current generator and for causing said surface electrical current generator to generate a second EM control current at the frequency of said first EM control current, said surface data processor means receiving digital programing signals contained within said first EM control current and logically operating thereon according to programs stored in said second programmable read only memory (PROM), said second random access memory (RAM) and said second electrically erasable read only memory (EEPROM) to convert said digital programming signals into digital instruction signals;

(o) surface modulator means for modulating said second EM control current with said digital instruction signals, said down-hole receiver means being operative to detect the modulated second EM control current down-hole in the module and to generate corresponding output signals;

(p) down-hole demodulator means for receiving said output signals and for converting signals contained within said modulated second EM control current into an instructional digital data string, said down-hole microprocessor means logically operating on said instructional digital data string according to programs stored in said first programmable read only memory (PROM), said first random access memory (RAM), and said first electrically erasable programmable read only memory (EEPROM) to convert said instructional digital data string into a set of instructions for programming said down-hole microprocessor to control i) collection of analogue data signals from said down-hole sensing devices, ii) generation of said second EM transmission current, and iii) modulation of said second EM transmission current with said digital transmission data signals.

11. The system of claim 10 wherein;

(i) said surface frequency control means causes said surface electrical current generator to generate said second EM control current at a frequency fi contingent upon receipt of a periodic acknowledgement signal from said surface demodulator means, (ii) said module frequency control means causes said down-hole electrical current generator to generate said second transmission current at the frequency fi, and (v) said down-hole modulator means includes digital modulating means for modulating said second EM transmission current with periodic acknowledgement signals contingent upon continuous receipt of said second EM control current generated by said surface generator at the frequency fi for a selected period, said surface demodulator means digitally demodulating said first EM control current generated down-hole to provide said acknowledgement signal, said surface control means switching the frequency of said first EM transmission current generated by said surface electrical current generator to successively lower frequencies fx in an absence of receipt of said acknowledgement signal until successive acknowledgement signals are received, the frequency of said first EM transmission currents then generated by said surface generator being at the frequency fi.

12. The system of claim 10 wherein;

(i) said down-hole control means causes said down-hole electrical current generator to generate said second EM transmission current at a frequency fi contingent upon receipt of a periodic acknowledgement signal from said down-hole demodulator, (ii) said surface control means periodically causes said surface electrical current generator to generate said first EM transmission current at the frequency fi, and (v) said surface modulator means includes digital modulating means for modulating said first EM transmission current with an acknowledgement signal contingent upon continuous receipt of said second EM transmission current generated by said down-hole generator at the frequency fi for a selected period, said down-hole demodulator digitally demodulating said first EM transmission current to provide said acknowledgement signal, said down-hole control means switching the frequency of said second EM transmission current generated by said down-hole electrical current generator to successively lower frequencies fx in an absence of receipt of a periodic acknowledgement signal until successive acknowledgement signals are received, the frequency of EM transmission currents then generated by said down-hole generator being at the frequency fi.

13. The method of claim 10 wherein the respective means for setting the respective electric current generators to generate the respective EM transmission and control currents at the detected frequency (d & m), each comprise in combination, means controlling one of the surface and module electric current generators for sweeping a range of frequencies with one the generated EM transmission current and control currents;

means measuring the current drawn from the particular electrical generator as the particular generated EM current sweeps through the frequency range for finding the particular frequency $f_m$ at which maximum current is drawn, that frequency being the desired frequency for both the EM transmission and control currents, and respective surface and down-hole control, the respective surface and down-hole frequency control means setting the respective surface and down-hole EM alternating current generators to generate the respective EM control and transmission currents at the frequency $f_m$.

14. The system of claim 11, or 12 wherein the the respective electric current generators are generating transmission and control currents at a desired frequency $f_1$, and further including,
(u) surface and down-hole switching means for switching the frequency of the respective EM alternating control and transmission currents generated by the particular electrical current generator to successive frequencies $f_2, f_3, \ldots f_z$, and switching the bandwidth of the particular receiver means to receive the particular EM current generated to bandwidths $B_2, B_3, \ldots B_z$, the respective frequency control means setting the respective electric current generators to generate the respective periodic EM currents at the detected frequency verifying receipt of the particular EM transmission and control currents at the respective frequencies,
(v) memory means for remembering the particular frequencies and bandwidths for which acknowledgement signals were received, whereby, upon loss of an acknowledgement signal at the module or ground surface, the particular processor instructs the particular switching means to simultaneously switch i) the particular electrical current generator to generate the EM transmission or control current, and ii) the bandwidths of the surface or down-hole receiver to receive at one of the particular frequency $f_z$ for which an acknowledgement signal had previously been received.

15. The method of claim 3, 4 or 5 wherein the steps of modulating the EM transmission current (step f), and of modulating the EM control current (step n) further include the steps of:
(1) selecting a series of digital signal modulation modes $M_x$ from a predetermined set of such modulation modes $M_1, M_2, \ldots M_n$ according to a preset start-up program,
(2) modulating at least one of the particular periodically generated EM alternating currents with the acknowledgement signal using each modulation mode $M_1$,
(3) receiving and demodulating the particular digitally modulated periodically generated EM alternating currents according to the preset program using converses of the modulation modes $M_1, M_2, \ldots M_n$,
(4) comparing quality of the respective acknowledgement signals received and demodulated from the particular periodically generated EM alternating current,
(5) choosing an initial modulation mode $M_i$ that produces a desired quality to the acknowledgement signal received and demodulated from the particular periodically generated EM alternating current, and thereafter
(6) modulating and demodulating the transmission and control currents with the respective digital transmission data and instruction signals using the initial modulation mode $M_i$.

16. The method of claim 15 after choosing the initial modulation mode $M_i$ and upon loss of the desired quality in the acknowledgement signal received and demodulated from the particular periodically generated EM alternating current, further including the step of:
(7) modulating and demodulating at least one of the particular periodically generated EM alternating currents with the acknowledgement signal using a subsequent modulation mode $M_s$ from the predetermined set of modulation modes according to a pre-set loss-of-signal program, and upon failure to obtain a satisfactory acknowledgement signal from the received and demodulated periodically generated EM alternating current repeating steps 2 through 6.

17. The system of claim 14 further including:
(w) digital signal modulation means having a predetermined set of modulation modes $M_1, M_2, \ldots M_n$ for modulating at least one of the particular periodically generated EM alternating currents with the acknowledgement signal using each modulation mode $M_1$ according to a preset program, the particular demodulator means receiving and demodulating the particular digitally modulated, periodically generated EM alternating current using converses of the modulation modes $M_1, M_2, \ldots M_n$,
(x) signal quality comparison means receiving the acknowledgement signals demodulated from the particular periodically generated, digitally modulated EM alternating current for choosing a modulation mode $M_d$ that produces a desired quality to the acknowledgement signal demodulated from the particular periodically generated EM alternating current, whereby, the transmission and control currents are thereafter modulated and demodulated with the respective digital transmission data and instruction signals using the modulation mode $M_d$.

18. The system of claim 9 wherein the down-hole electrical current generator in the module comprises in combination,
a first annular insulative region of the module composed of an electrically insulative material interrupting the electrical continuity of the drill string providing two electrically isolated sections of the drill string,
means for oscillating an electrical potential difference between the respective electrically isolated sections of the drill string,
a second annular insulative region of the module composed of an electrically insulative material also interrupting the electrical continuity of the drill string located below the first such annular region,
central contact means establishing electrical contact above and below the second annular insulative region for defining an electircal conduction path bridging the second annular insulative region, and
a toroidal transformer means for sensing electrical currents flowing through the electrical conduction path having an electrical impedance optimizing the section of the drill string below the first first annular insulative region for launching an electromagnetic (EM) current in combination with the section of the drill string above first annular insulative region.

19. The system of claim 18 wherein the down-hole receiver means comprises means for sensing frequency of oscillations of the electrical potential difference between the respective sections of the drill string above and below the first annular insulative region.

20. The system of claim 19 further including means oscillating an electrical potential difference between the respective sections of the drill string above and below the first annular insulative region for launching an electromagnetic (EM) excitation current into geological strata substantially below the down-hole module, the toroidal transformer means sensing electrical currents flowing across the electrical conduction path bridging the second annular insulative region providing a current signal reflective of a distribution of energy in a summation of such EM excitation currents as a function of time.

* * * * *